United States Patent
Locher et al.

(10) Patent No.: US 7,257,878 B2
(45) Date of Patent: Aug. 21, 2007

(54) CONTINUOUS CABLE PROCESSING APPARATUS

(76) Inventors: Beat Locher, Bierigutstrasse 9, CH-3608 Thun (CH); Jiri Stephan, St. Gallerstrasse 76, CH-7320 Sargans (CH)

( * ) Notice: Subject to any disclaimer, the term of this patent is extended or adjusted under 35 U.S.C. 154(b) by 0 days.

(21) Appl. No.: 10/972,634

(22) Filed: Oct. 25, 2004

(65) Prior Publication Data

US 2005/0050713 A1 Mar. 10, 2005

Related U.S. Application Data

(60) Division of application No. 09/068,278, filed as application No. PCT/EP97/05216 on Sep. 23, 1997, and a continuation-in-part of application No. PCT/EP96/04790, filed on Nov. 4, 1996.

(30) Foreign Application Priority Data

| Nov. 6, 1995 | (CH) | 3235/95 |
| Sep. 23, 1996 | (CH) | 2329/96 |

(51) Int. Cl.
*B23P 23/00* (2006.01)

(52) U.S. Cl. .......... 29/564.4; 29/33 M; 29/33 F; 29/748; 81/9.51

(58) Field of Classification Search ........... 29/564.4, 29/33 M, 33 F, 748, 564.3, 564.6; 81/9.51
See application file for complete search history.

(56) References Cited

U.S. PATENT DOCUMENTS

| 4,879,926 A | * | 11/1989 | Wollermann et al. | 81/9.51 |
| 5,445,051 A | * | 8/1995 | Carpenter et al. | 81/9.51 |
| 5,709,027 A | * | 1/1998 | Kato et al. | 29/564.4 |

* cited by examiner

*Primary Examiner*—Erica Cadugan

(57) ABSTRACT

A continuous cable processing apparatus for producing cable sections with processed ends comprises a cable transport apparatus having at least one transport device for moving and holding the cable in the axial direction and, transversely thereto, a knife station. According to a special variant, two transport devices are arranged in the longitudinal cable direction on both sides of the knife station and, after the cable has been cut through, each hold one of the cable end regions produced on cutting, so that said end regions are movable in the longitudinal cable direction. At least one of these end processing stations is arranged transversely with respect to the longitudinal cable direction, adjacent to the knife station and at least one transport device is movable transversely with respect to the longitudinal cable direction so that a cable end region can be fed to the end processing station.

5 Claims, 33 Drawing Sheets

Fig. 3 Module for CS9150
Roller Construction
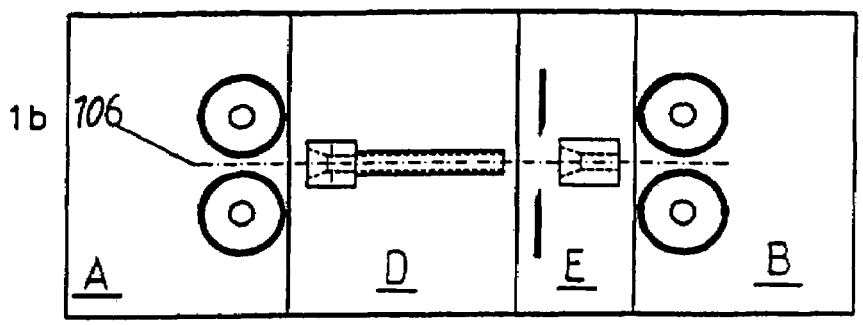
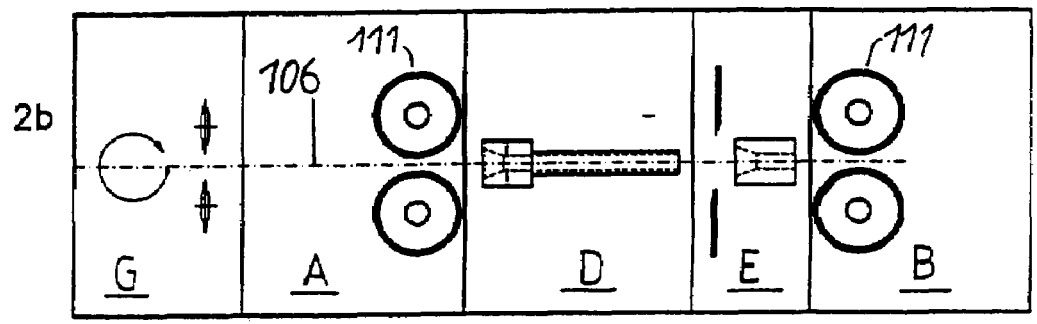
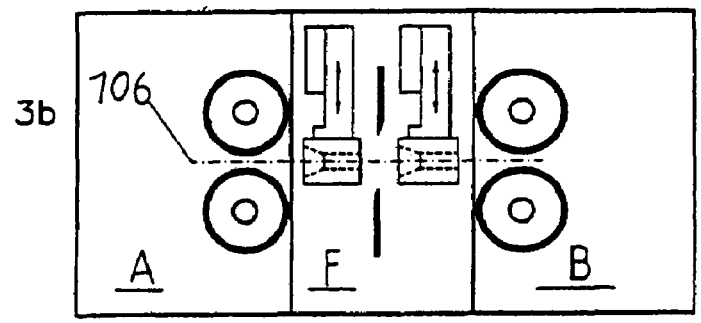
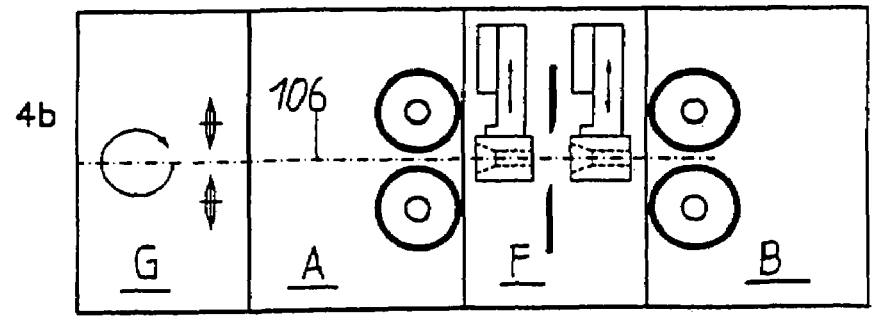

Module for CS9150

Tape Guide

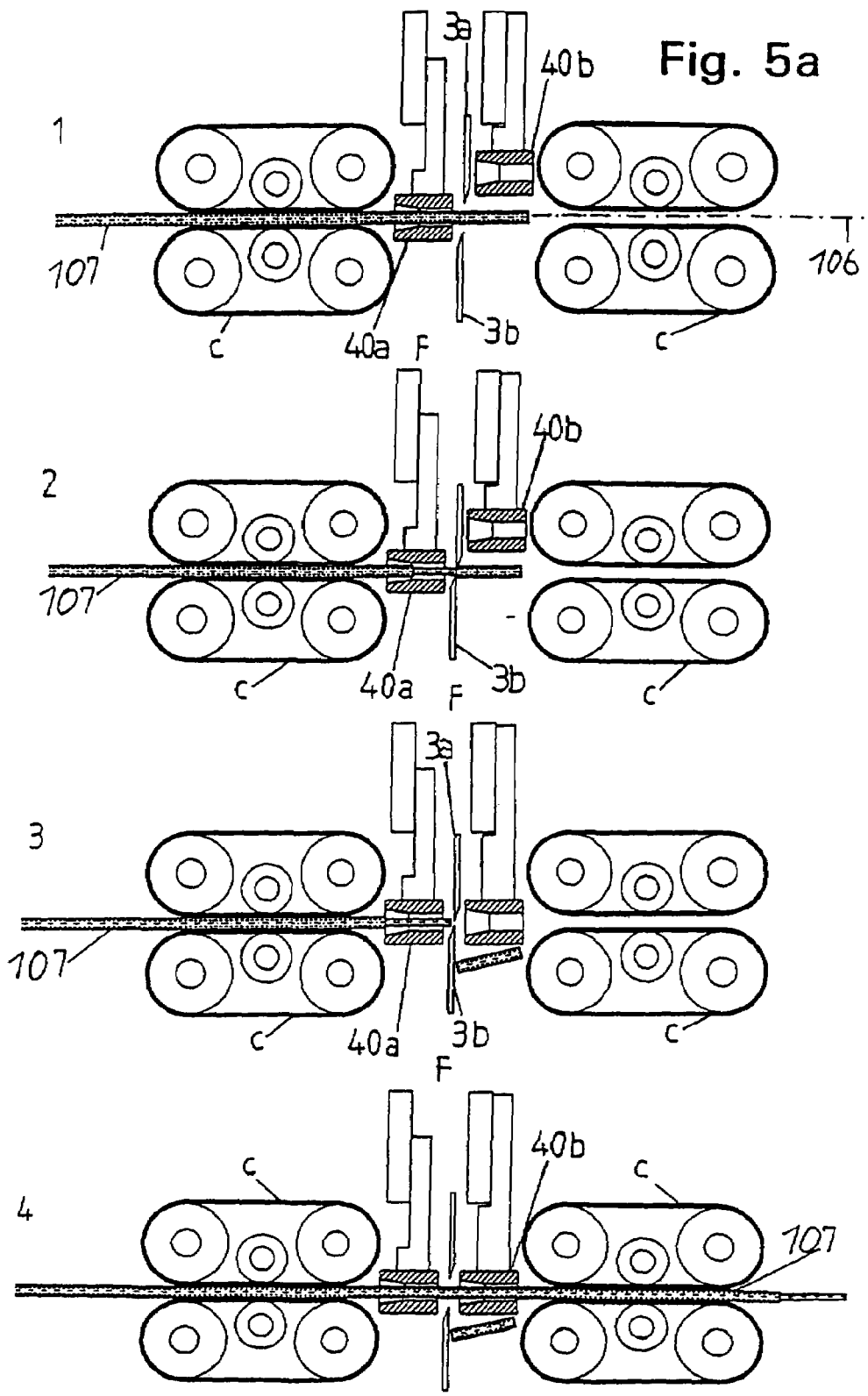

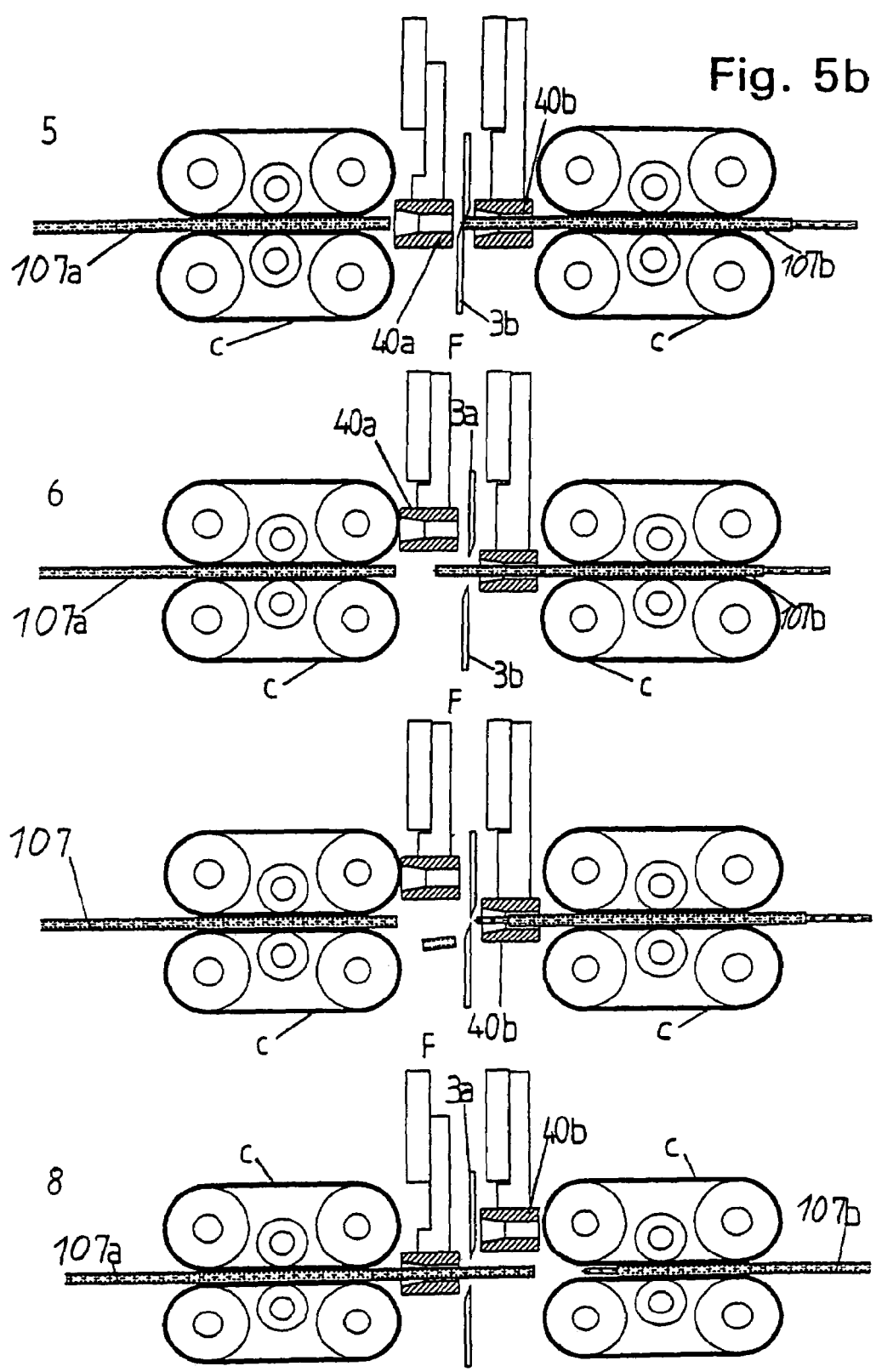

Fig. 10
| 2 Knife Position single wire processing | 3 Knife Position single wire processing | 2 Knife Position dual wire processing | |
|---|---|---|---|
| 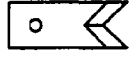 |  | a) 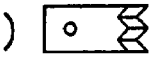 | V-Knife |
| 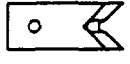 | 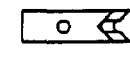 | a)  | Radius Blade |
| 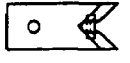 | 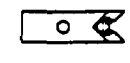 | | Radius Blade with shoulder |
| 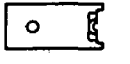 | 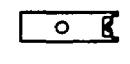 | | Shaping Blade |
| 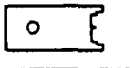 | 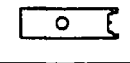 | | Slotting Blade |
| | | | |
| c) 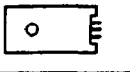 | c) 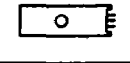 | | Stripping Knife |
| b1) 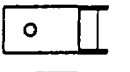 | b1) 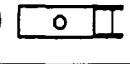 | b1)  | Surface Knife |
| 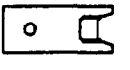 | 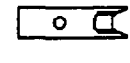 | | Surface Knife U-Form |
| b) 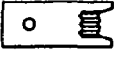 | b) 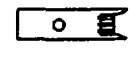 | | Surface Knife Contour |
|  | 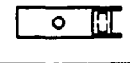 | 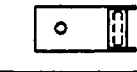 | Surface Knife with Shoulder |
|  | 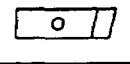 | | Surface Knife Specialized |

Stripped length at right greater than 50mm

Fig. 17
Operations Screen
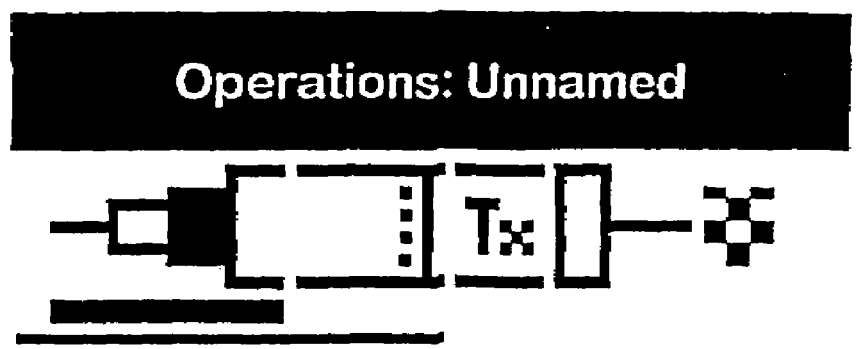
1 Terminating
2 Coaxial Slot
3 Coaxial Step
4 Cutter Discharge
5 Cutter Slot
6 Cutter Step
Exit  Sort  Edit  Paste  Cut  Exit
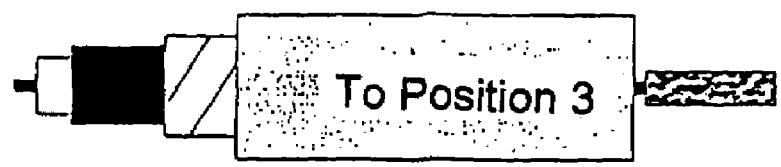

Fig. 18
1 Terminating 
2 Coaxial Slot 
3 Coaxial Step 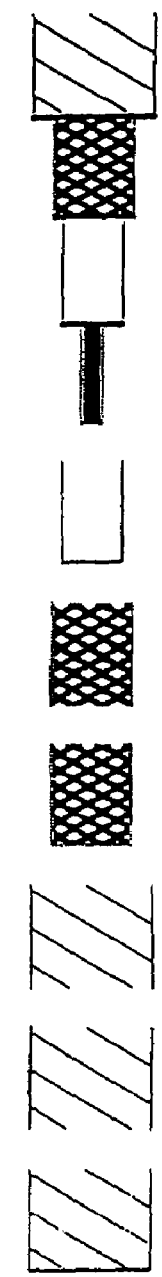
4 Cutter Discharge 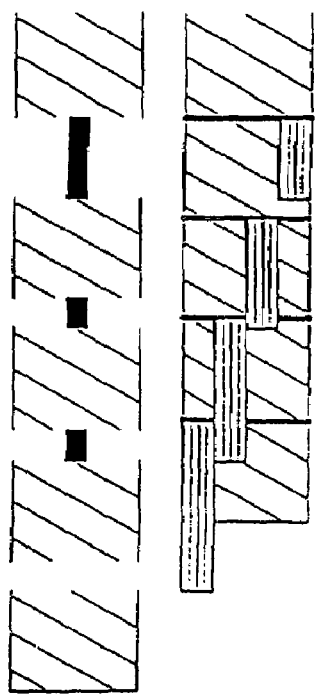

5 Cutter Slot
6 Cutter Step
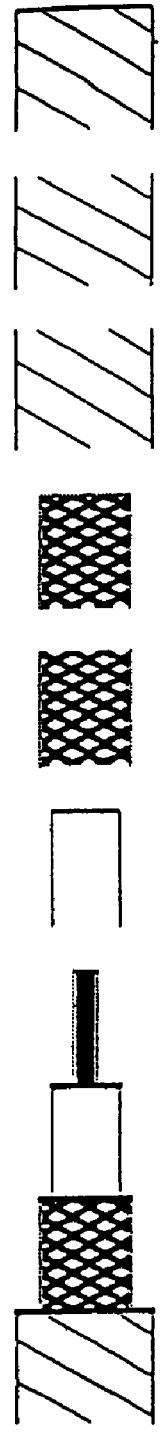
Fig. 20a
End 1: Terminating
SPEWIR04.DS4

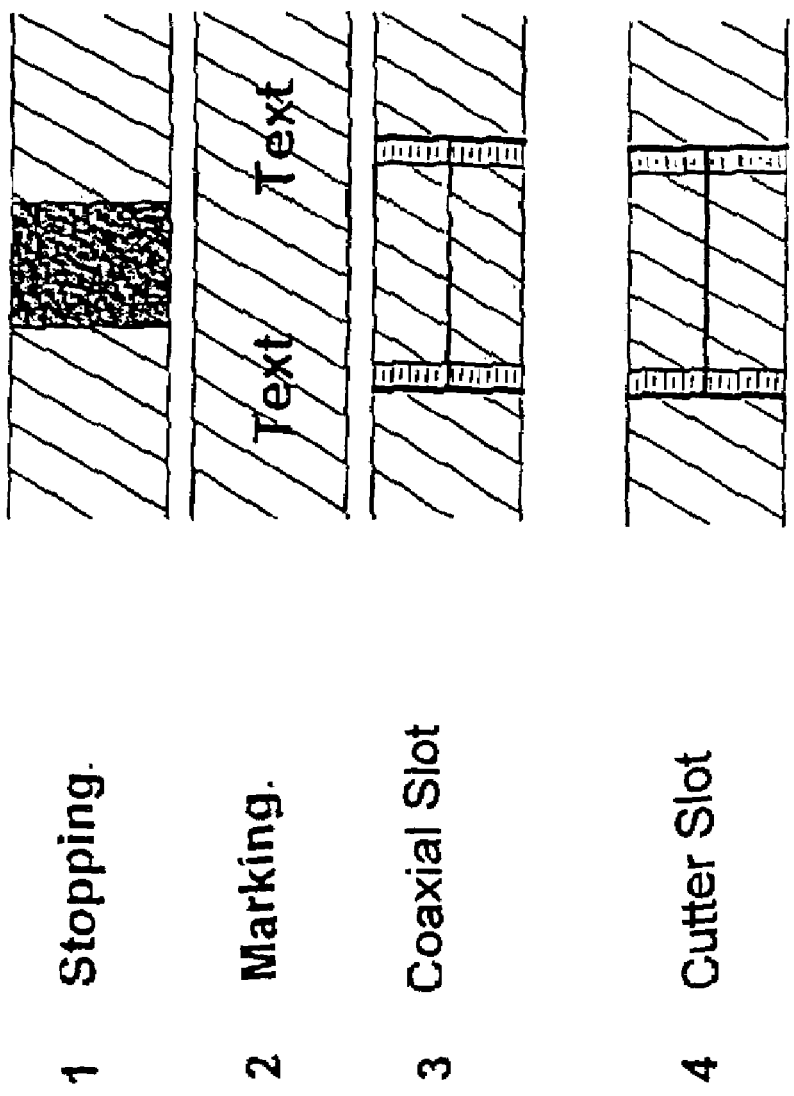

Fig. 20d
End 4: Cutter Discharge:
SPEWIR12.DS4, SPEWIR13.DS4
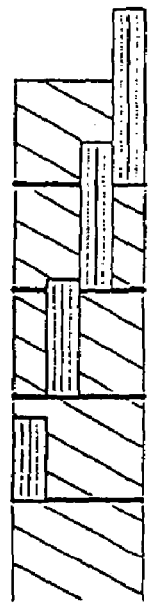
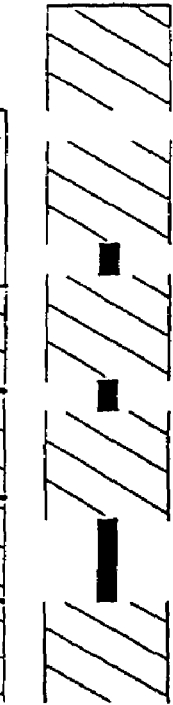
Recommended Operation:
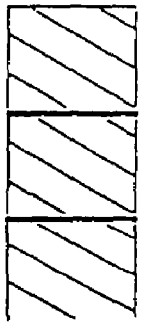
End 5: Cutter Slots:
see under Coaxial Slots
End 6: Cutter Steps:
see under Coaxial Steps
Middle Part 1: Stopping:
SPEWIR14.DS4
Basic Operation:

Fig. 20e₁
Middle Part 1: Marking
SPEWIR15.DS4
Basic Operation:
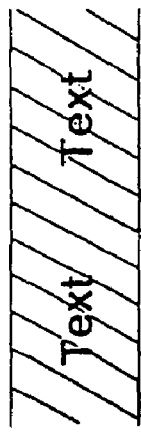
Further Operation:
Middle Part 3: Coaxial Window
SPEWIR10.DS4, SPEWIR11.DS4

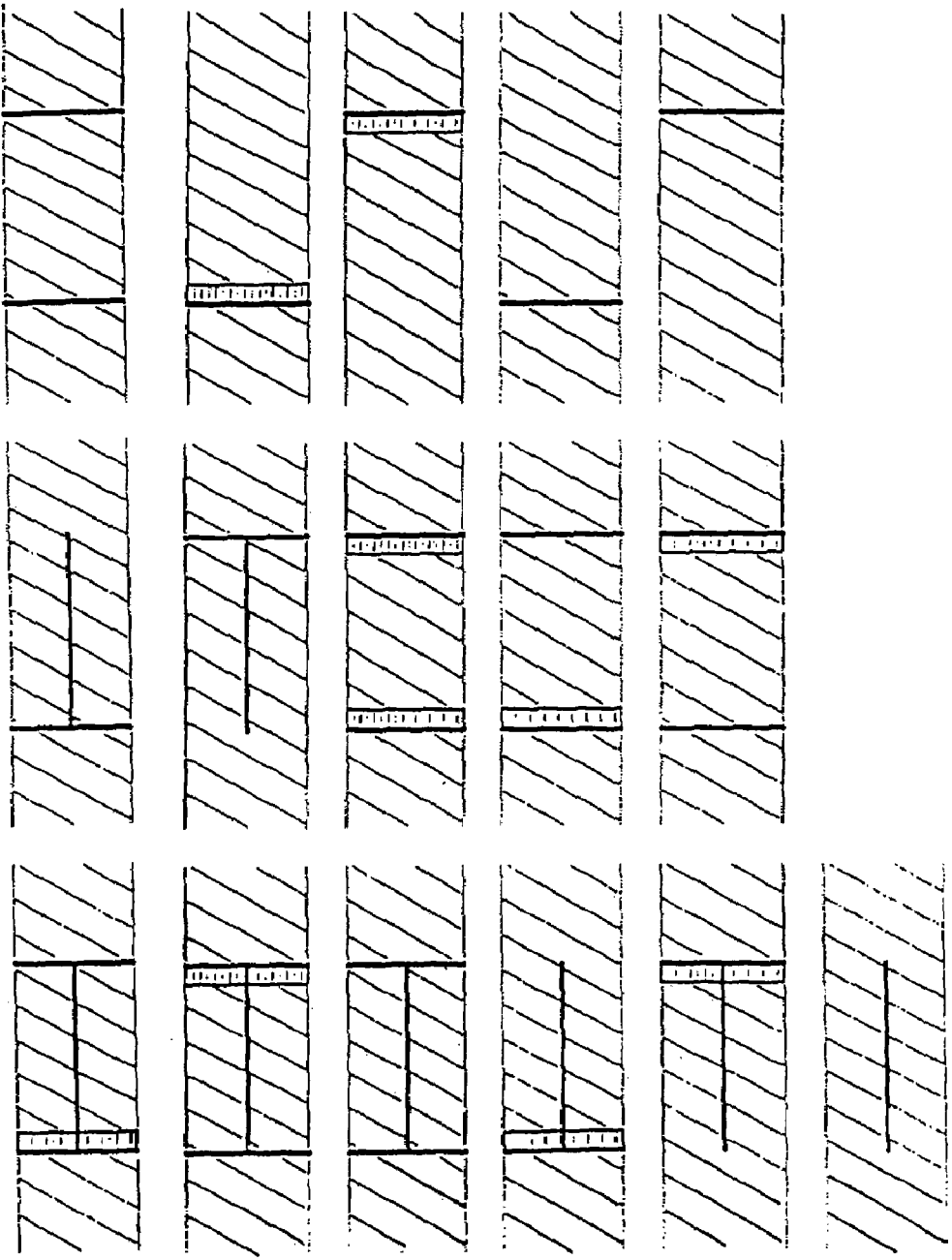

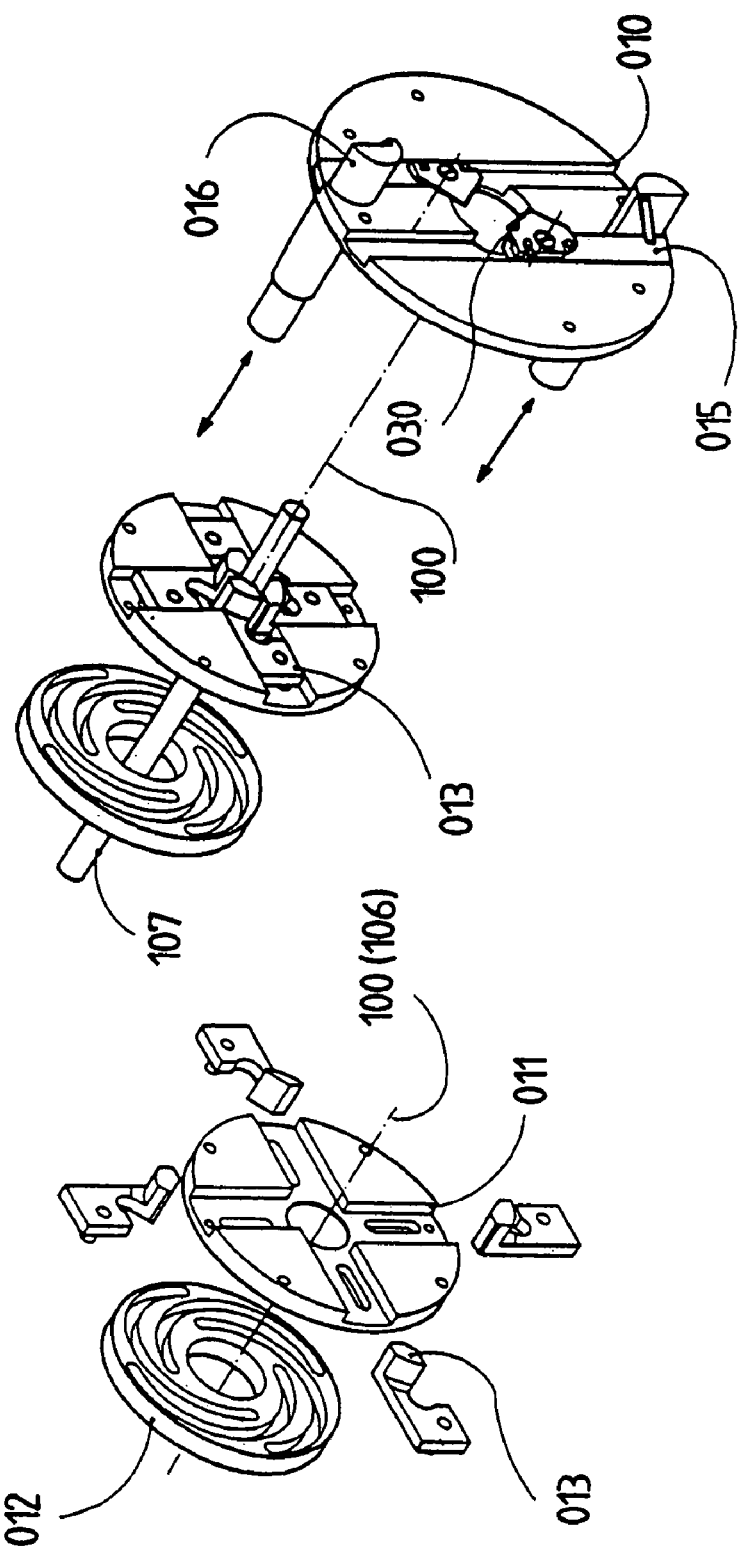

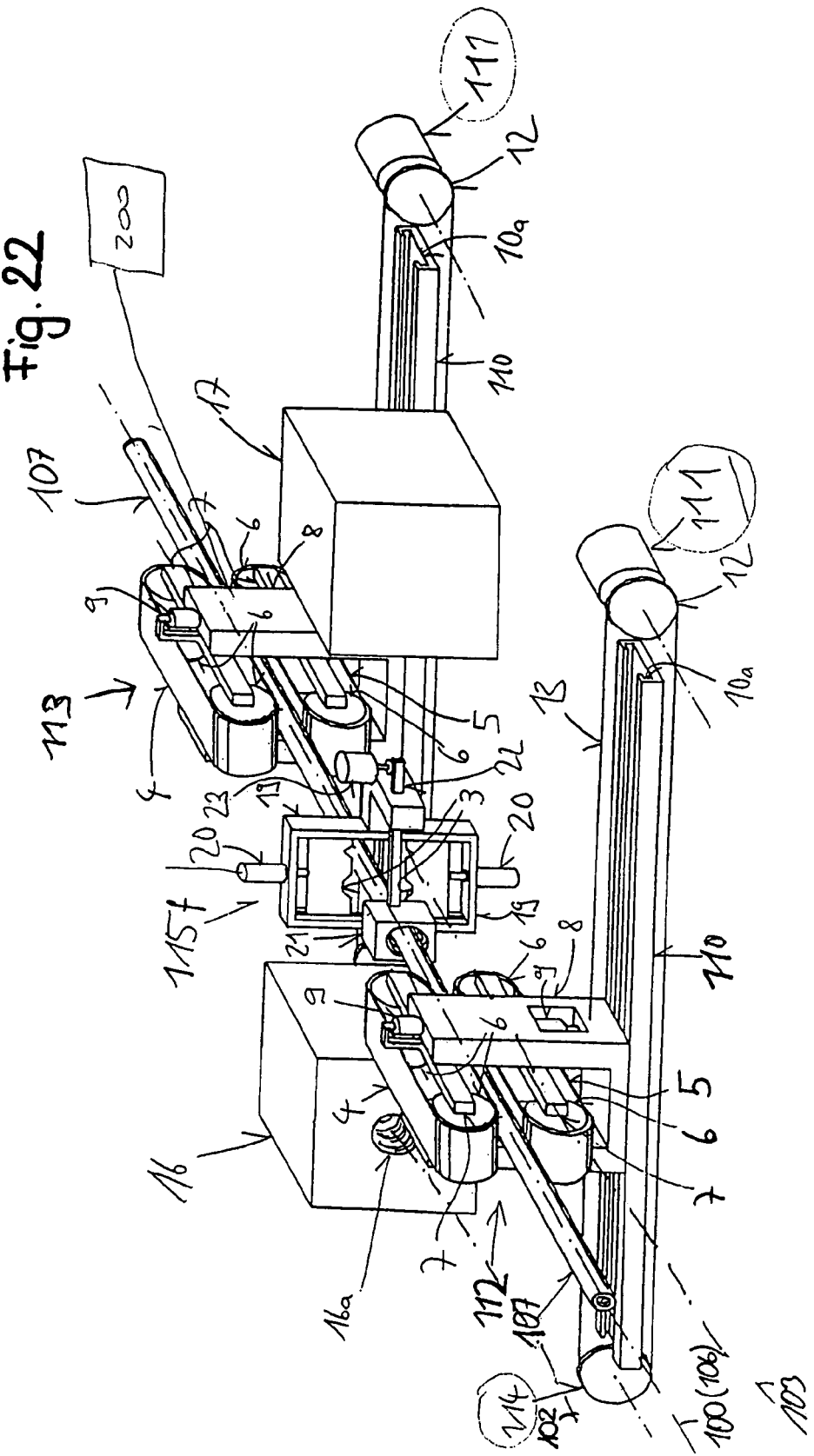

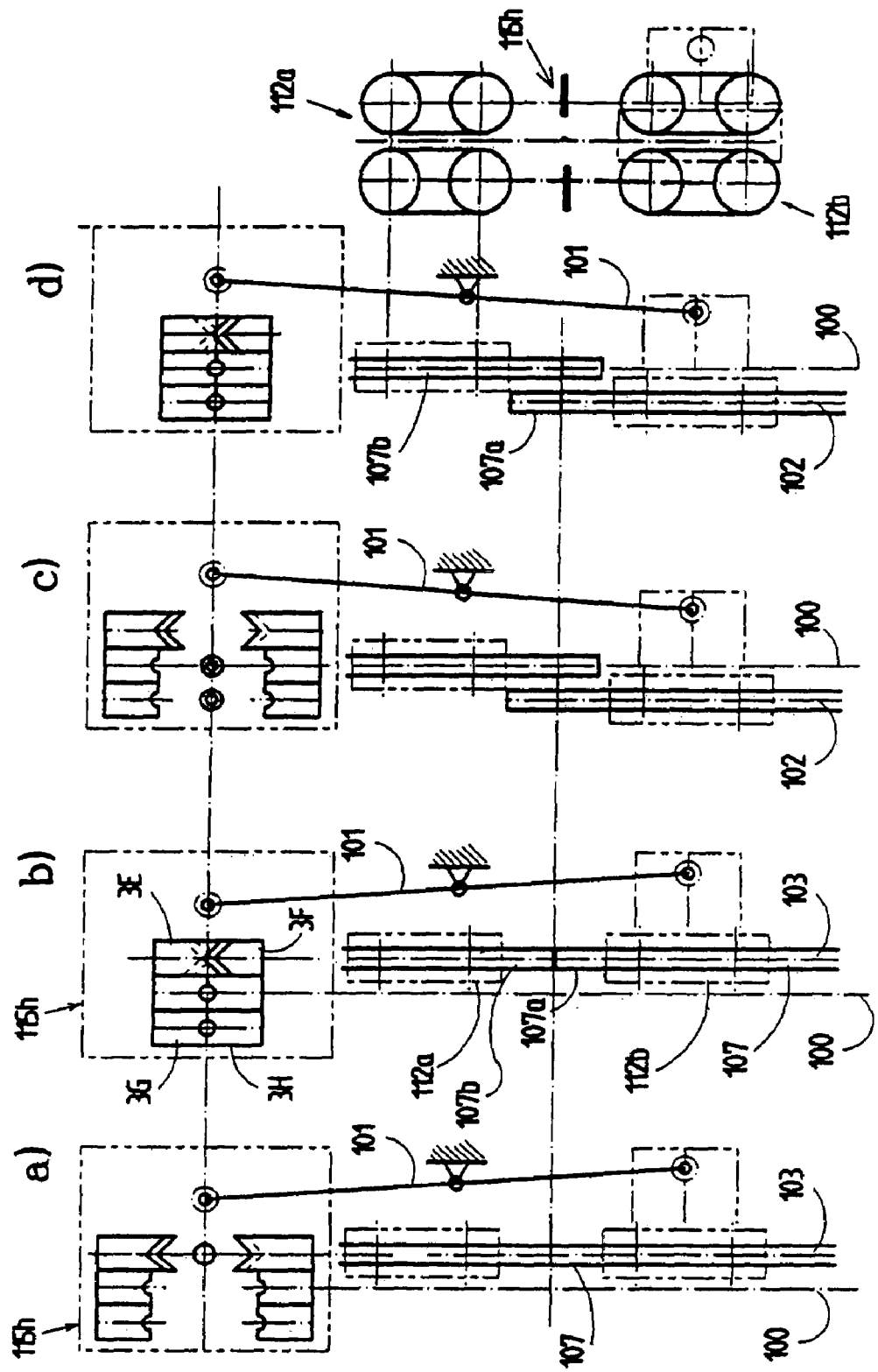

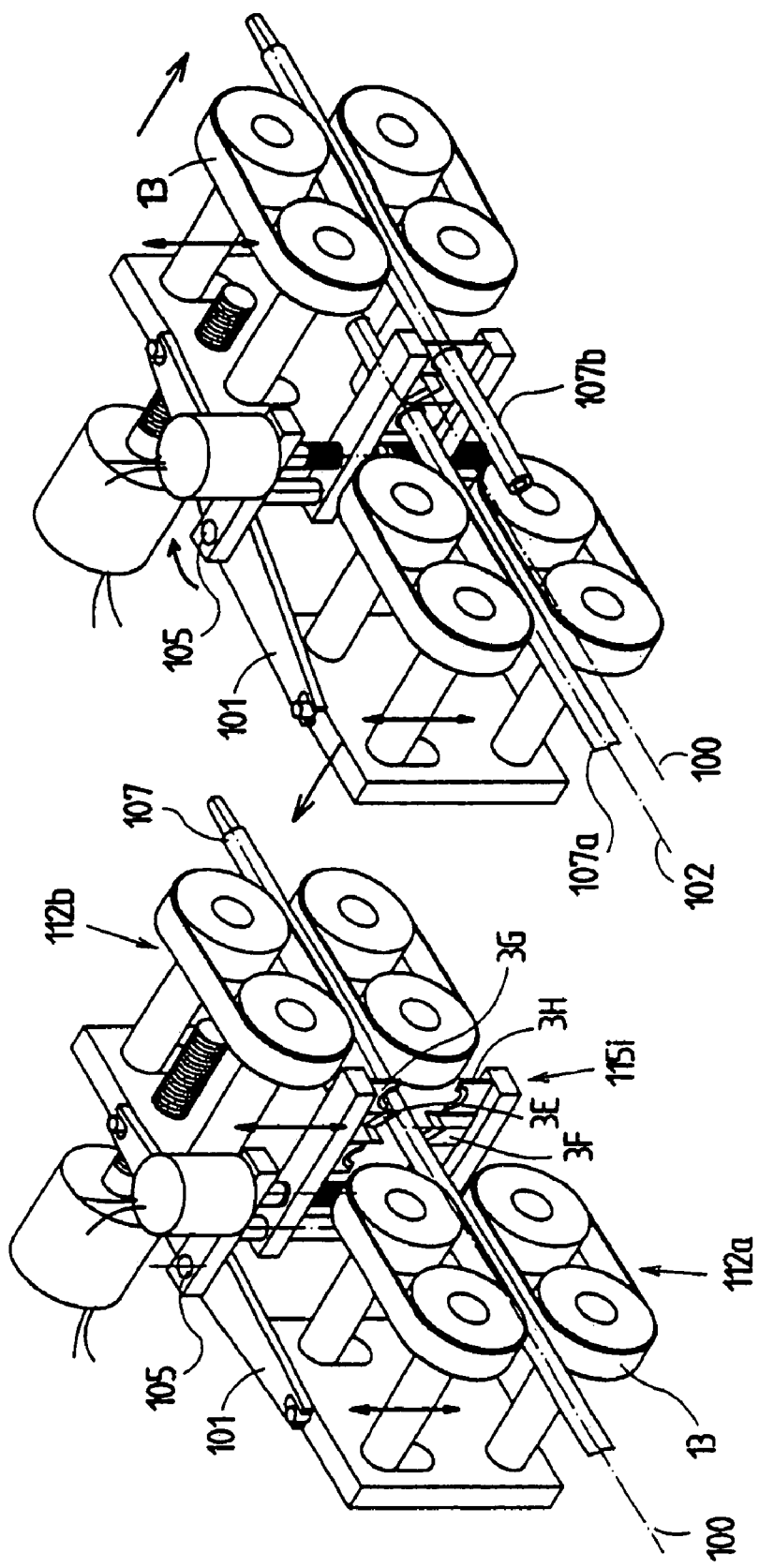

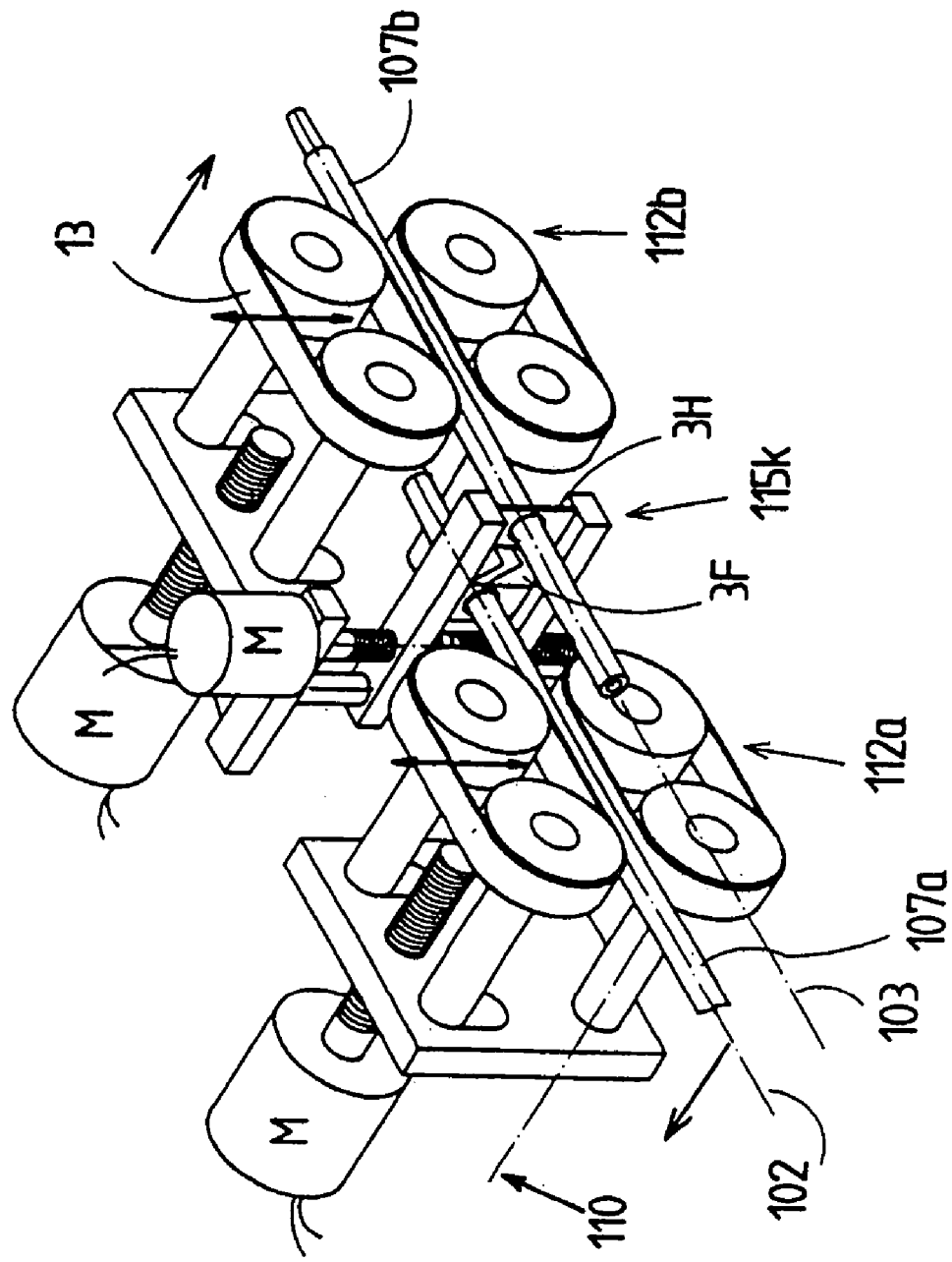

Position for Knife Changing

CONTINUOUS CABLE PROCESSING APPARATUS

CROSS-REFERENCE TO RELATED APPLICATIONS

This Divisional Application of U.S. patent application Ser. No. 09/068,278 is filed under 35 USC 111 claiming priority benefits of U.S. patent application Ser. No. 09/068,278 under 35 USC 120. U.S. patent application Ser. No. 09/068,278 (now allowed) entered the national stage under 35 USC 371 on Jul. 9, 1998, and is PCT/EP97/05216, filed on Sep. 23, 1997. PCT/EP97/05216 claims priority under 35 USC 119 to Swiss Application CH 2329/96, filed on Sep. 23, 1996. PCT/EP97/05216 (and hence, U.S. patent application Ser. No. 09/068,278) is a Continuation in Part Application of PCT/EP96/04790, filed Nov. 4, 1996, which claims priority under 35 USC 119 of Swiss Application CH 3235/95, filed on Nov. 6, 1995. Thus, the present Continuation Application of U.S. patent application Ser. No. 09/068,278 also claims priority of Swiss Application CH 3235/95.

STATEMENT REGARDING FEDERALLY SPONSORED RESEARCH OR DEVELOPMENT

Not applicable.

BACKGROUND OF THE INVENTION

BRIEF SUMMARY OF THE INVENTION

The invention relates to a continuous cable processing apparatus with a transport path along which a cable may be transported according to the invention, having a knife station and a cable transport apparatus. Excluded from the invention are therefore cable processing machines which process exclusively cable ends or single cable sections (not continuous cable). In the knife station, cables can be cut and/or processed, e.g. stripped of their insulation. For the purposes of the invention, the term knife station now also includes apparatuses for other cable processing types, such as, for example, crimping, marking or the like. The cable transport apparatus transports the cable along its axis or along a transport path to and from the knife station.

FIELD OF THE INVENTION

DESCRIPTION OF RELATED ART INCLUDING INFORMATION DISCLOSED UNDER 37 CFR 1.98 AND 1.98

Conventional continuous cable processing apparatuses operate with cable processing in the knife station, along a transport path. This type of end processing establishes the processing times. However, a disadvantage with attachments involving such processing in a working area into which various processing tools or processing stations can be inserted is that it is not possible to use processing stations which are longer than the distance between the transport means on both sides of the knife station. On the other hand, however, this distance should not be too large because otherwise short cable sections cannot be provided. Moreover, with a large distance, a further guide element would have to be used between the receiving region of the processing station and the transport means, which is associated with an additional cost. In addition, in known continuous cable processing apparatuses the cable can be transported onward only in an axial direction.

For example, the Applicant launched on the market, under the name CS9100, an apparatus which had pairs of knives which were laterally offset with respect to the cable feed axis, which were adjacent to one another and which were capable of being laterally displaced via an upper and a lower common knife holder by a pneumatic drive in such a way that a cable fed into the apparatus along the axis could be cut into or cut through by either one or other knife. For this purpose, of course, the upper and lower knife holders were displaceable relative to one another. This has an advantage over a single knife position; at the same time, however, the disadvantage of this design in practice is the limitation of possible processing operations, which are restricted to the two knife positions.

EP-A1-365691 describes an apparatus having a pair of knives which has several blades on each knife. After conventional longitudinal cable transport, the cable is cut there by means of the multiblade knife. After opening of the knife, the cable handling components move linearly and parallel to the knife to the left or right to an insulation stripping position on the multiblade knife. The handling components on both sides of the knife with the cut cables are then displaced to the required insulation stripping length in the direction of the knife. This is followed by further knife movement to the desired insulation stripping diameter and the stripping of the insulation residue (slug) and the linear transport of the cable onwards or backwards, depending on the further processing.

A disadvantage of this means is that the two cable handling components (before and after the knife) constantly have to be displaced in the longitudinal and transverse direction, leading to considerable wear of two components highly mobile essentially independently of one another (in addition to the axial feed drive for the cable). These must also be specially adjusted to one another in order to be able to work with the correct position and without waste. In addition, the use of a multiblade knife is uneconomical since nonuniform wear may occur and it may therefore also be necessary to replace blades which are not worn.

Moreover, this apparatus requires particular flexibility of the cable, which is otherwise liable to be destroyed.

Another known apparatus "Stripmaster Model 900" from Ideal Ind., Inc. Sycamore, USA also has die blades arranged adjacent to one another and having different effective knife diameters, so that cables having different diameters can be inserted into feed orifices adjacent to one another and can be cut by the knives or stripped on pulling out again. This apparatus is not suitable for automatic insulation stripping operations.

A further known apparatus, as disclosed in EP-A1-623982, has a swivel apparatus with which a cable can be positioned at one of two knives arranged adjacent to one another. The problem of cable flexibility occurs here too. Moreover, the cable does not rest optimally perpendicular to the plane of the knife in this apparatus, so that cuts by the knife may also be performed obliquely, with the result that the cuts may be of poor quality, unless the second knife is positioned obliquely relative to the first one. However, such an oblique position described by the EP A1 has the disadvantage that it is optimized only for specific knives; in addition, it broadens the attachment of the knife supports. The use of other tools is not envisaged.

A further known apparatus from Eubanks Engineering Co, Monrovia, USA, with the designation "9800" has knives arranged axially one behind the other and with different cutting depths. The knives are present on a common upper and lower knife support so that an inserted cable can be subjected simultaneously to several different processing steps along its axis. Such an apparatus is disclosed, for example, in U.S. Pat. No. 5,146,673. The disadvantage of such an arrangement is a relatively low flexibility in the choice of the processing steps; moreover, the limited space between the knives restricts the possible insulation stripping length. In an attempt to increase the insulation stripping lengths, limits were encountered with regard to the maximum acceptable size of the apparatus.

In the prior art "Kodera Type 34", the insulation stripping length was limited to the distance between knife and second pair of rollers. With a special insulation stripping process in single steps, it is true that it was possible to strip individual sections with the length corresponding to this distance in succession (but not to strip the insulation away completely from the conductor but to move it a little at a time on the conductor in the stripping direction=partial stripping). The Kodera Type 36 with a greater distance between insulation stripping knives and second pair of rollers was provided to permit longer partial insulation stripping steps but had the disadvantage that short cable pieces could not be stripped with this apparatus. This circumstance is to be improved by a novel process.

A further problem is that thin flexible cables cannot be concentrically guided in the case of the guides with rigid inner diameters mounted in the known apparatuses, e.g. Eubanks 9800, which may lead to problems (more frequent breakdowns) in the cable feed.

Problems also arise in the ejection of the waste (slug) of insulation residues which are stripped from the conductor by the knife and, from case to case, were not properly removed to date, since they sometimes stuck to the conductor and thus led to breakdowns.

JP-A-1-281403 describes a multistation cable processing apparatus in which the cable to be processed is fed to the respective stations along a semicircle by means of a pivotable distributor. The cable is either not continuous or is forcibly bent.

U.S. Pat. No. 4,009,738 describes a cable insulation stripping apparatus in which cable ends in the knife region are moved parallel out of their transport path in order to compensate for disadvantageous crushing effects during cutting of these cables. As is clearly evident in FIG. 5 of this US-A, however, buckling of the cable end piece occurs.

None of the known continuous cable processing apparatuses thus offers possibilities for removing a cable from its present transport path without buckling or bending, in order to transport it to another processing station, a manipulator arm or merely to another knife within this knife station. In the case of specific cable types, this leads to considerable problems and thus restricts the universality of the relevant apparatuses.

JP-A-3-15211 describes a cable end processing apparatus which permits buckling- and bending-free transportation of a cable end from one processing station to another one, but continuous cable processing is not possible therewith since secondary transport means are lacking and it was evidently also not obvious to propose such means by appropriate complicated structural conversions. JP-A-62-217816, U.S. Pat. Nos. 3,653,412, 4,244,101, 4,446,615, 4,833,778 and 4,879,926 describe comparable insulation stripping apparatuses which transport individual cable pieces transversely with respect to their longitudinal extension by transport means from one processing station to the other. However, longitudinal feeding of the cable by these known attachments is not known.

JP-A-9-46844 which appeared in the priority interval also relates to a cable end processing device and not to a continuous cable processing device. Nevertheless, this document attempts to provide a solution as to how various knives can be used in a compact manner at successive times but along a cable, thus also dispensing with bending or buckling of this cable. For this purpose, the various knives are arranged adjacent to one another and can be transversely displaced on rails toward the cable in order to be able to process the cable end piece inserted in each case. After the processing, however, this must be removed from its processing position again in order to make space for the next cable.

It is thus a first object of the invention to provide an improved apparatus which permits the processing of cables, which are not to be buckled or bent. Furthermore, the processing speed should be kept high or increased. In particular, the flexibility of the processing steps and of the cable handling should furthermore be increased.

On the other hand, it is a second object of the invention to provide an improved insulation stripping apparatus which is improved with regard to the universality, permits larger insulation stripping lengths and avoids the disadvantages of the above-mentioned designs.

As a third object, it is also intended to find possibilities for processing coaxial cables continuously and in particular reliably, the universality not being restricted as a result.

These objects are achieved by various inventive steps, which include a continuous cable insulation stripping apparatus with a transport path along which a cable may be transported. The parallel relative movement between a cable in a continuous cable processing machine and the knife station avoids cable bending or buckling, and the flexibility increases. An embodiment includes a pair of tool supports for holding at least two tools in pairs, and a tool support feed for lateral positioning of at least one of the at least two tools above a first transport path along which a cable whose insulation is to be stripped can be inserted and transported in its feed direction, whereas the axis of the cable is parallel to the first transport path, and the tool support feed is formed for a controlled lateral drive for controlled sideward movement of at least one of the pair of tool supports to any desired position within a working range laterally with respect to the first transport path. The apparatus includes upper and lower positions, comprising a separate and independent tool support feed coordinated with each tool support so that the upper and lower positions of the at least two tools can be combined, and the combination is achieved by independent motors for the independent tool support feeds.

There are essentially two variants of these attachments: the knife station or its tools execute a transverse movement toward the cable according to the invention, or the cables in or with their transport means execute a transverse movement relative to their first transport path according to the invention. Mixed forms are within the scope of the invention.

Regarding the first variant: The object is achieved by the apparatus according to the invention, wherein the continuous cable insulation stripping apparatus has a transport path along which a cable may be transported. The transport path is parallel to the axis of a cable to be transported along the transport path, comprising at least one tool, at least one tool support, and a positioner that relatively positions the at least one tool support in a direction perpendicular to a working direction of the at least one tool and perpendicular to a parallel transport path wherein the positioner positions the at least one tool support to more than two positions. The novel knife arrangement and its drive lead to a universal, fully automatic and freely programmable cutting and insulation stripping facility. This is further supplemented by additional, novel processing steps as required. Known disadvantages are avoided. The compact design possible according to the invention is advantageous in practice and very universal.

Further features of the invention are described according to the invention.

What is important in any case is that any desired tool positions according to the invention are provided side by side and a stepping motor control is capable of selecting these tool positions in a programmable manner, so that on the one hand the cable—or several cables side by side—which is or are held in one position can be processed in different tool positions. This applies to continuous cable processing as well as to insulation stripping apparatuses where an operator or manipulator inserts a cable end into the apparatus and then pulls it out again.

Secondly, other operations are also permitted, such as, for example, sawing, incision, twisting, deformation, crimping, etc., of the cable, by bringing together the knives or tools, closing them and laterally displacing them relative to one another. In the case of twisting jaws as tools with wedge-like oblique surfaces, this can also be realized by pure vertical movement relative to one another. Furthermore, twisting can be realized if the tool holders are designed to be pivotable about a rotation point which is as far as possible in the region of the cable axis, if the linear advance for lateral displacement of the tool holders then leads not to a displacement but to a rotation about this axis.

Further possible methods of processing exist if at least one tool holder has grinding or polishing disks which can be used for grinding the conductor ends by an oscillating or rotating movement of the knife holders, which may be important in particular in the case of glass fiber cables.

Motor control of the contact pressure or of the distance between the feed rollers or feed belts, which is provided according to the invention, has the advantage that the contact pressure on the cable can be increased during stripping in order thus to prevent slippage or in order to apply more force to the cable. If, as disclosed in the prior art, the contact pressure were to remain constant over the entire process, this would have the disadvantage that the cable or its sheath would suffer pinches over its entire length, which now occur at most in a small region. According to the invention, the wear of the belt is also reduced. Since the stripping resistance is as a rule greatest at the beginning of the stripping movement, according to the invention the contact pressure can be increased over a stripping distance of, for example, 4 mm and then reduced again to a lower level. Any marks or pinches are thus limited to about 4 mm.

The possibility of opening the rollers or belts individually is to be regarded as a further concept of the invention, in other words the drive units of the belts, both before and after the tool holder, can be opened and closed or adjusted in their contact pressure independently of one another. Preferably, the rollers not only can be adjusted in the contact pressure and moved to a desired distance apart by means of an electric motor but they can also optionally be completely opened. The coupled opening and closing of the two pairs of rollers by means of a single drive motor and a turntable is known per se from the machine ATC 9000 of Sutter Electronic AG Thun, which was published in 1989 and whose teaching in this context is considered to have been disclosed in the context of this invention, the rollers or belts being capable of being opened completely independently compared with the known rollers or belts.

A further advantage of the possibility of opening the second pair of rollers or of belts independently of the opening of the first pair of rollers or of belts is that a preliminary stripping of, for example, 130 mm can be carried out with the aid of a first pair of rollers after the cable has already passed through the second pair of rollers by the desired length, for example 500 mm, so that even long insulation stripping lengths, for example for mains cables, can be successfully stripped of insulation. Preliminary stripping of even greater lengths is also possible, the remainder of the insulation being stripped from the conductor subsequently by hand.

Conversely, for longer complete stripping or longer partial stripping, after preliminary stripping according to the above procedure the contact pressure of the second pair of rollers or of belts could be increased and the sheath stripped from the conductor under static friction by rotation in the stripping direction.

If it is intended to strip a long piece of insulation in a few individual steps, this can be carried out according to the invention by opening the second pair of rollers or pair of belts in each partial step. Compared with the known apparatus (e.g. KODERA Type 36 with a particularly large distance between the left and the right feed rollers), there is the advantage that even short cable sections can be stripped of insulation. Compared with the known apparatus (e.g. KODERA Type 34 with a relatively small distance between the left and right feed rollers), there is on the other hand the advantage of virtually any desired insulation stripping length and absolutely no limitation to the distance between tool holder and second, axially following pair of rollers, which to date limited the insulation stripping distance in all known machines.

Regarding the second variant: Apart from the cable processing in the (specific) knife station, the use of further processing stations may be practical, especially time-saving, for certain processing operations according to the invention.

The arrangement of further end processing stations directly adjacent to the knife station and optionally also insulation stripping station accordingly permits the use of any desired processing stations. Thus, it is also possible to use processing stations which are longer than an acceptable distance between the transport means on both sides of the knife station. In a preferred embodiment, after the cable has been cut, insulation is stripped from the two cable ends produced, in two insulation stripping stations arranged side by side and transversely with respect to the cable axis. Owing to the possibility of parallel end processing, the processing time of the individual steps can be halved. However, there are also advantages in conventional serial cable processing, due to the possibility of laterally transferring cables to transport or storage stations or the like.

Further features of the invention are described according to the invention or are evident from the information below which, with the description of the Figures and the drawings, represent a further disclosure of the features of the invention, some of which may also be used independently of one another.

What is important for these concepts of the invention in any case is that any desired stations, according to the invention, for the cable can be provided laterally side by side and at least one cable retaining means can be moved in a guide means by a drive apparatus, in particular a stepping motor control, in such a way that at least one cable end can be fed laterally to one of these stations. However, station is also to be understood as meaning, for example, a gripping arm or the like.

The stations which may be used permit not only insulation stripping but also other operations, such as, for example, sawing, incision, twisting, deformation, gripping, soldering, etc. Of course, additionally or alternatively, the tools may optionally be displaceably mounted and driveable transversely with respect to the cable axis within the individual processing stations.

Further processing facilities are obtained, for example, if at least one processing station has grinding or polishing disks which can be used for grinding the conductor ends by oscillating or circular movement, which may be important in particular in the case of glass fiber cables.

Preferably, the transport means or their rollers or belts can be opened, preferably individually. The drive units of the belts both before and after the knife stations, can be opened and closed independently of one another or can be adjusted in their contact pressure. Preferably, not only can the rollers be adjusted in the contact pressure and moved toward one another to the desired distance apart by means of an electric motor but they can moreover optionally be completely opened. The contact pressure is preferably adapted to the processing steps in the respective processing station.

Compared with the known processing station, there is the advantage that both small and any desired large processing lengths, in particular insulation stripping lengths, are permitted from both ends simultaneously, without unnecessarily removing and feeding the cable ends. The processing length is not at all limited to the distance between the two transport means.

Thus, with respect to the improved universal equipment of insulation stripping machines, it is also intended—according to the invention—according to a fourth basic concept—to house clamping and/or centering jaws and/or cutting apparatuses in modules which can be added to or removed from a basic frame of an insulation stripping machine. According to the invention, it is particularly advantageous if such modules can be mounted so that they are movable and lockable, for example pivotable, in order to provide better access during servicing, for example, during changing of jaws or knives.

BRIEF DESCRIPTION OF THE SEVERAL VIEWS OF THE DRAWING(S)

It is noteworthy that combinations of the features described or individual aspects of the invention which are applicable independently of one another are also within the scope of the invention.

Preferred embodiments are described with reference to exemplary Figures, which do not restrict the various aspects of the invention. The Figures are described contiguously and as a whole since—with the exception of FIG. 22—identical reference symbols denote identical components and identical reference symbols with different indices denote similar components with the same or similar functions. The list of reference symbols and the information content of the Figures are an integral part of this application.

FIG. 3 shows symbolic examples of different modular configurations of a novel modular design of an insulation stripping machine having a roller drive;

Figure 6:
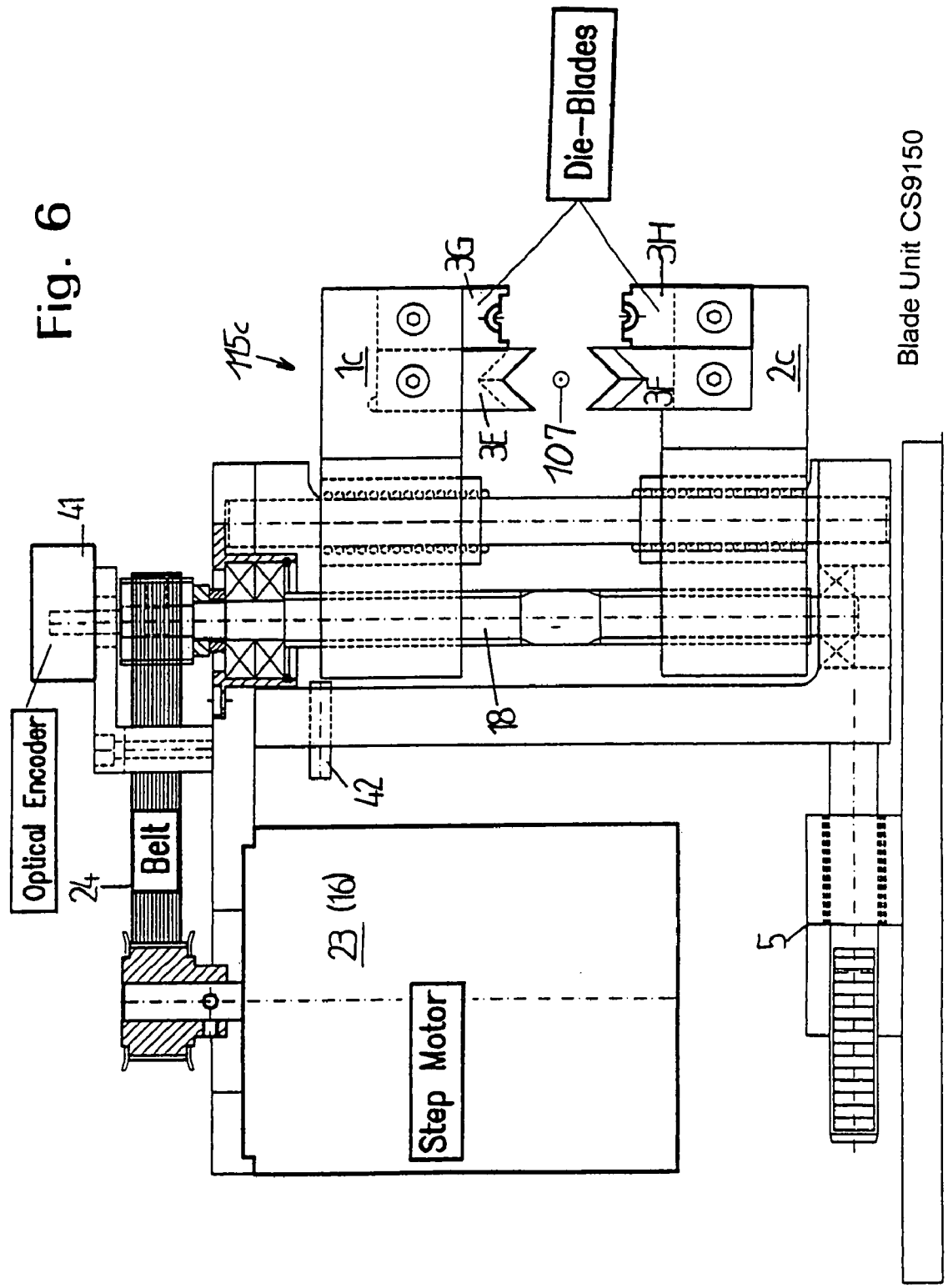
Figure 7:
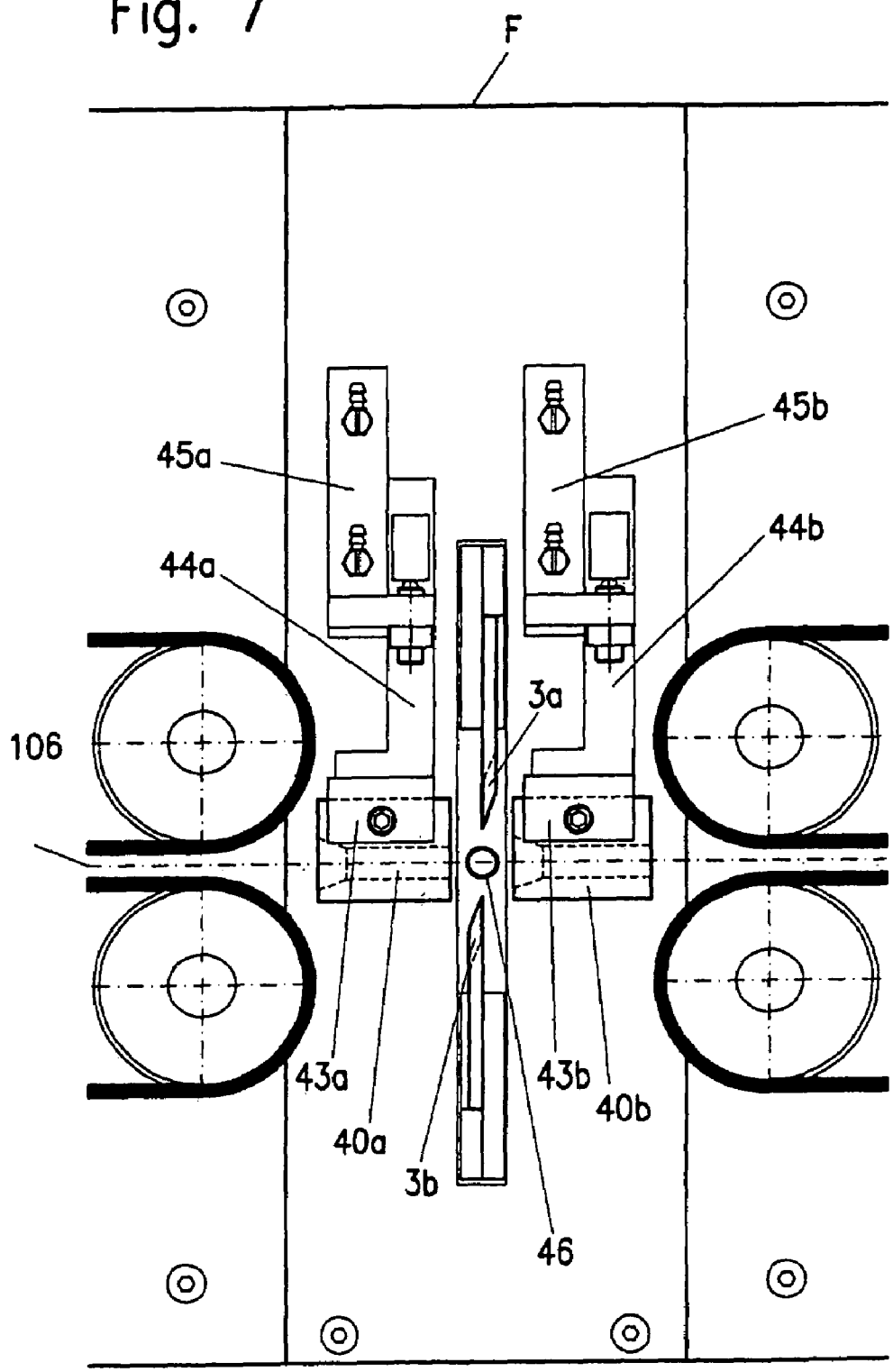
Figure 8:
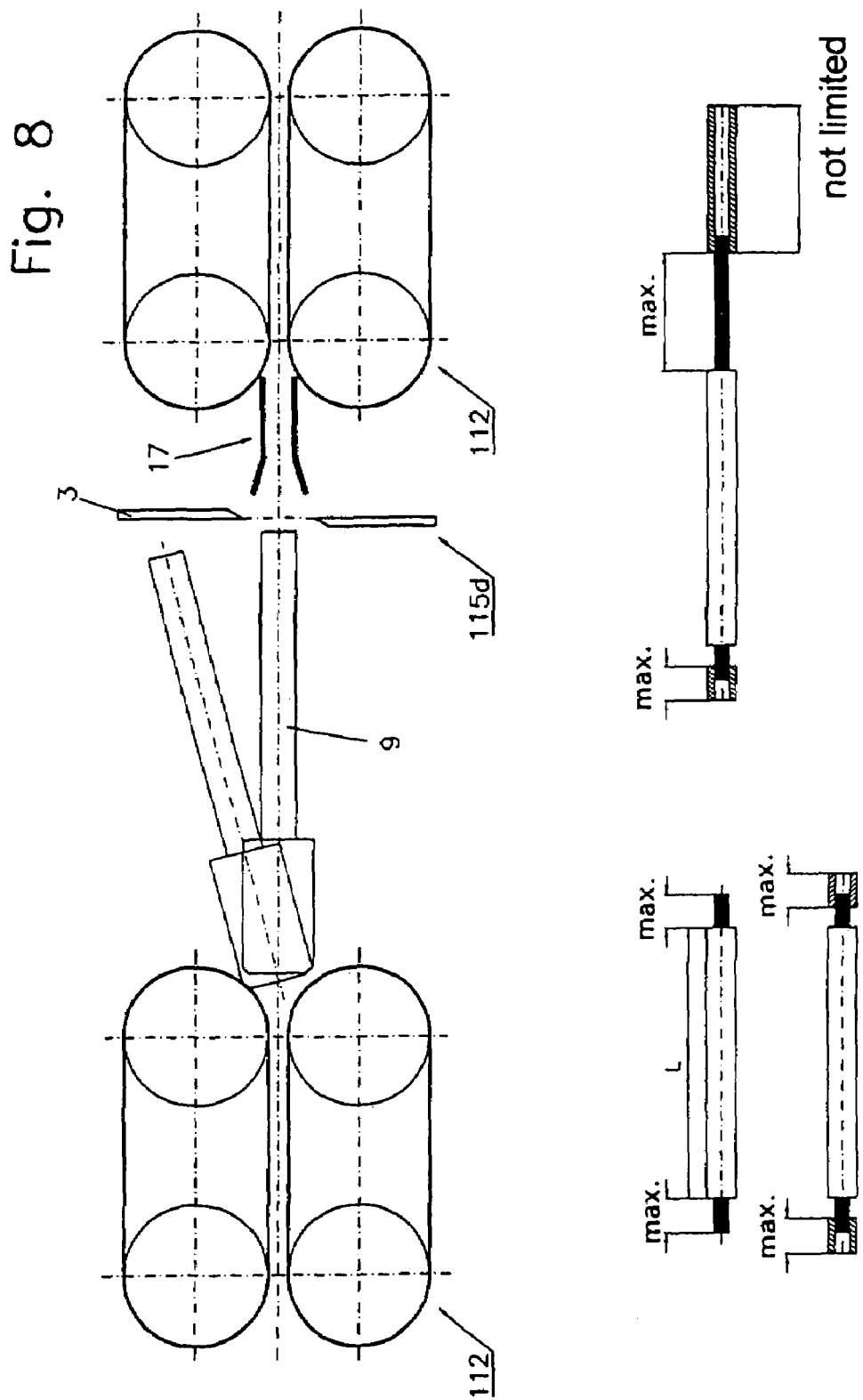
Figure 9:
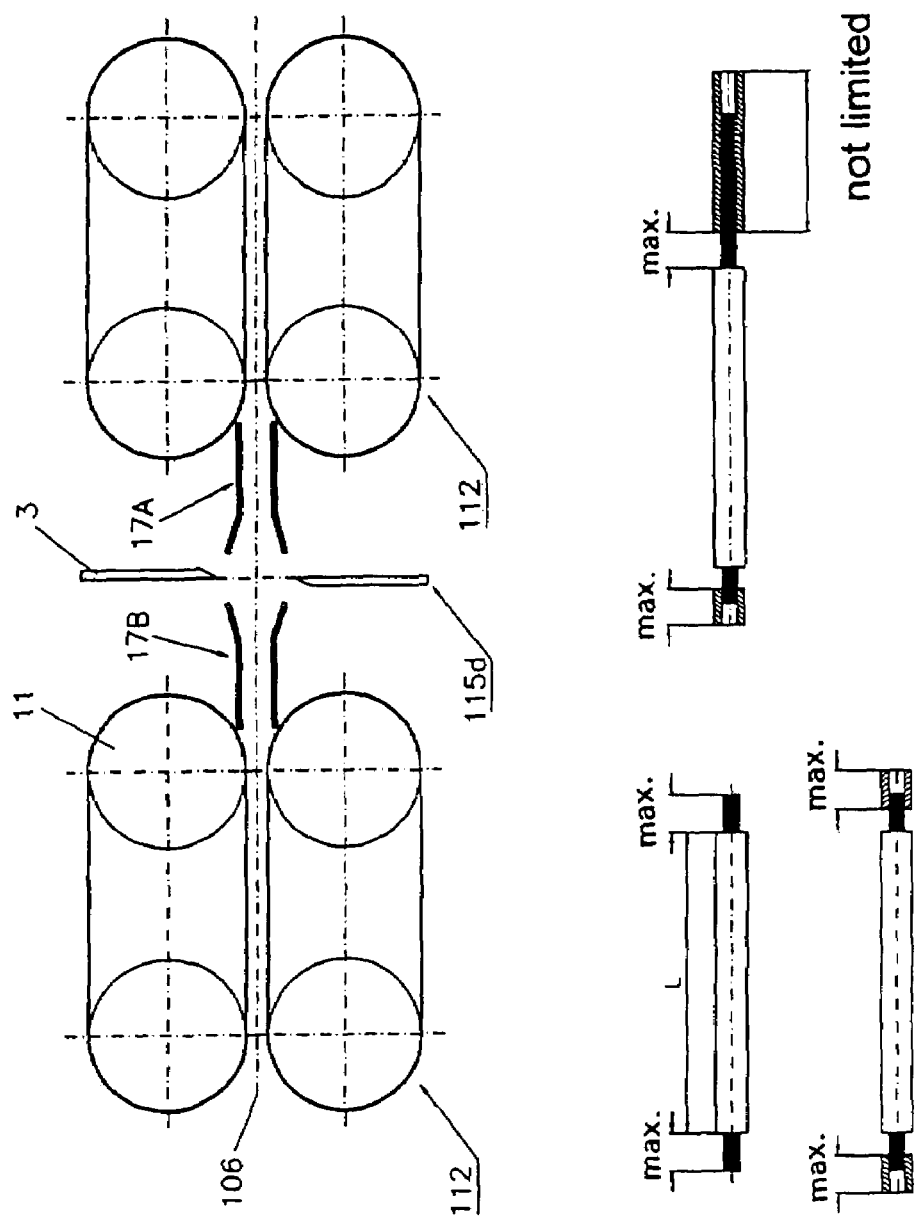
Figure 11:
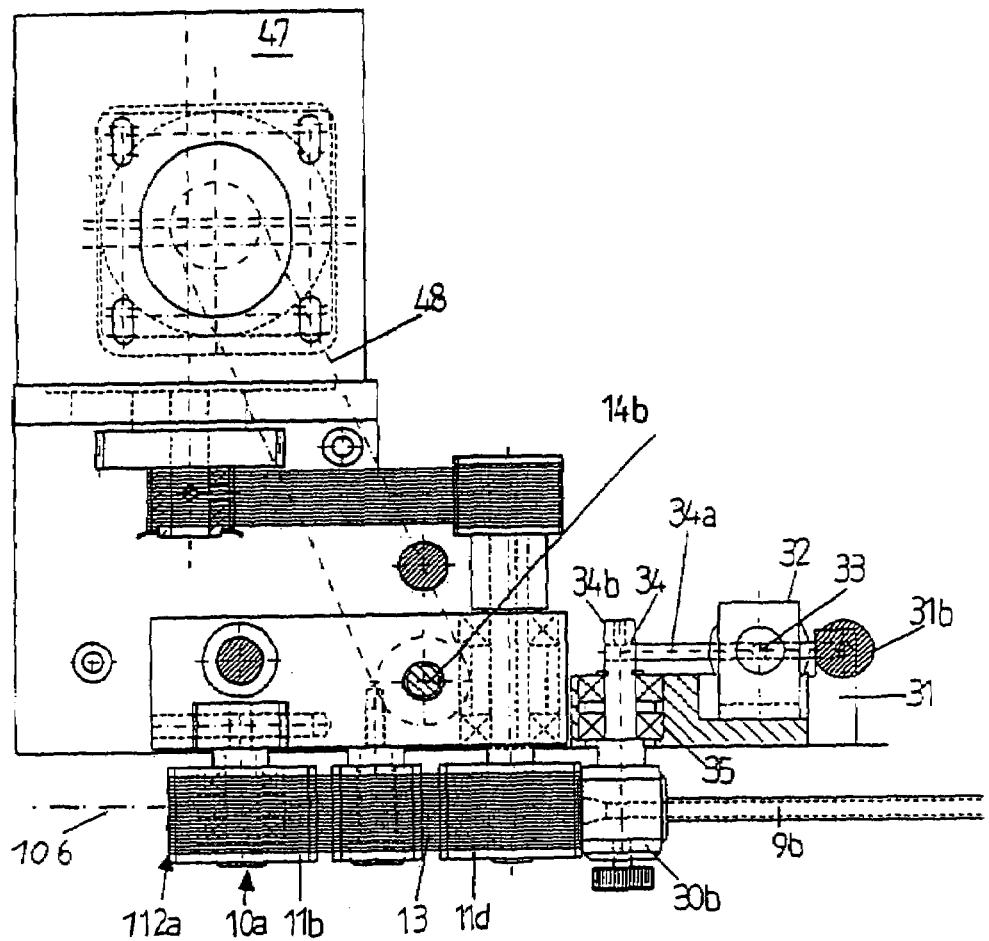
Figure 12:
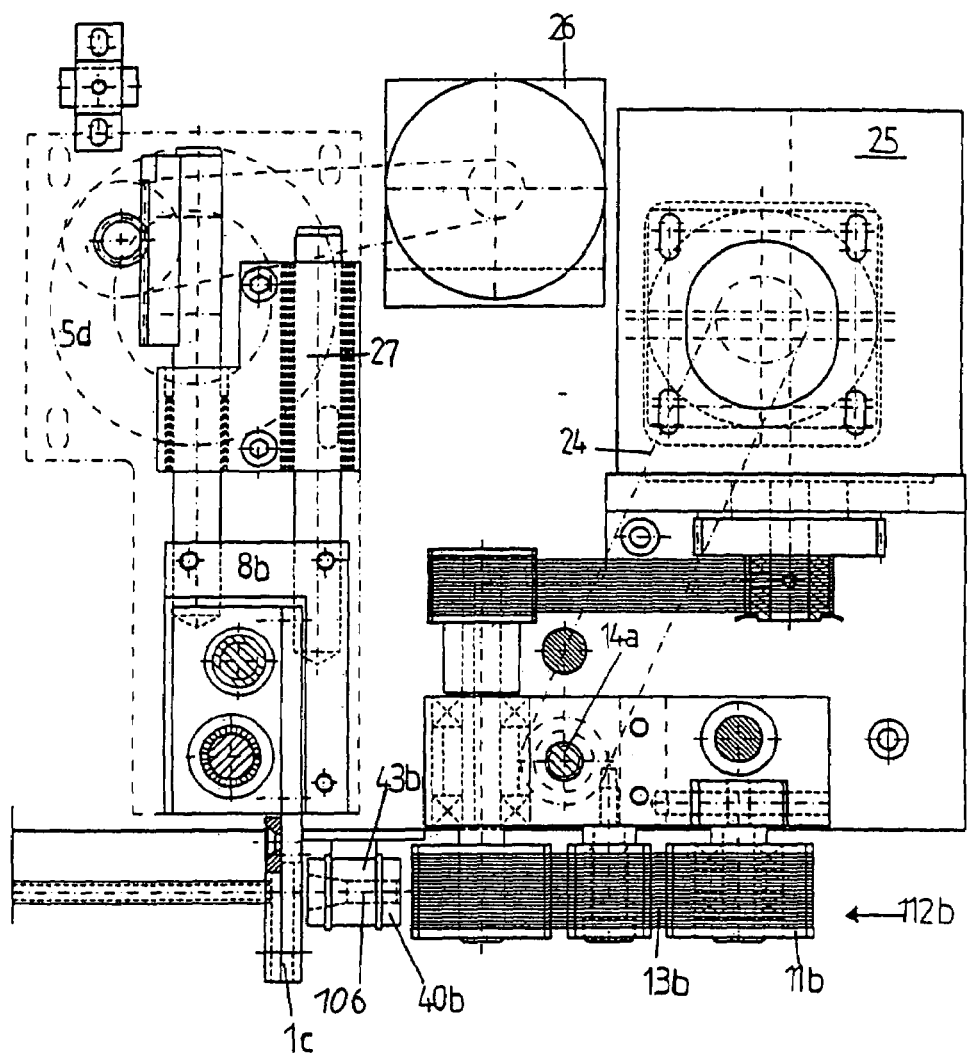
Figure 13:
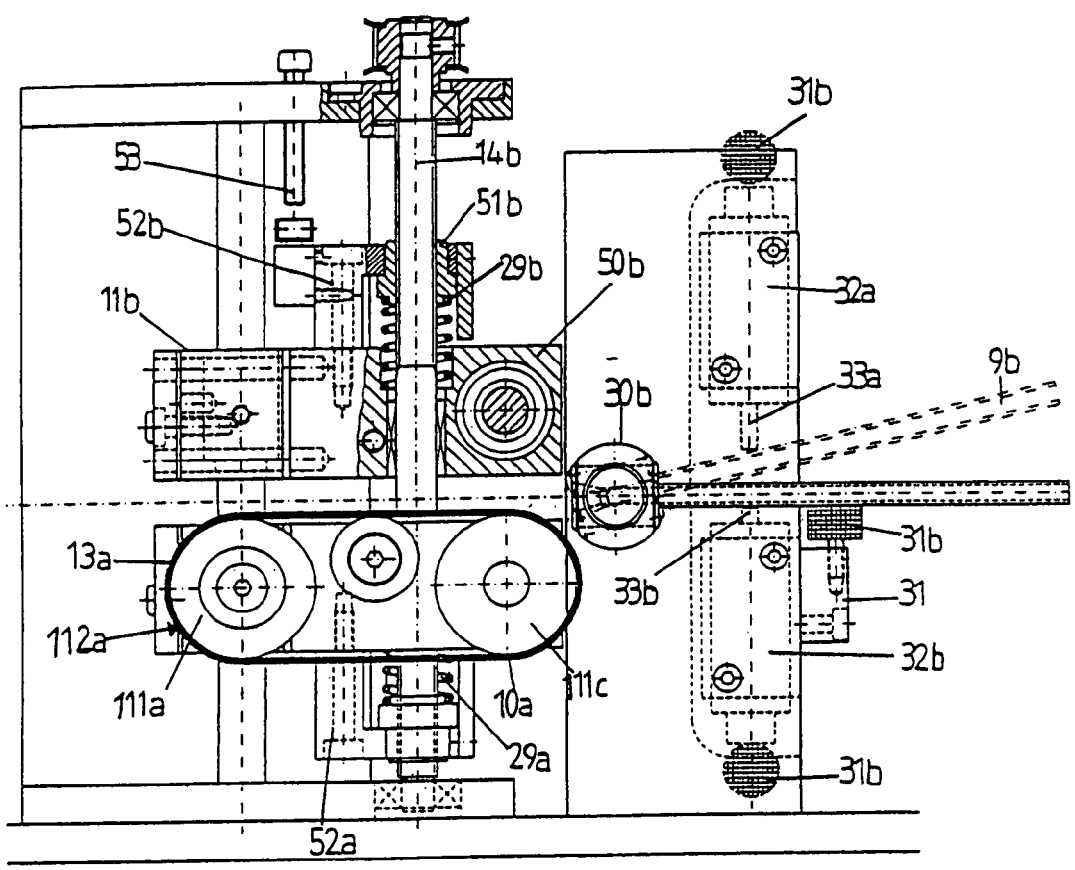
Figure 14:
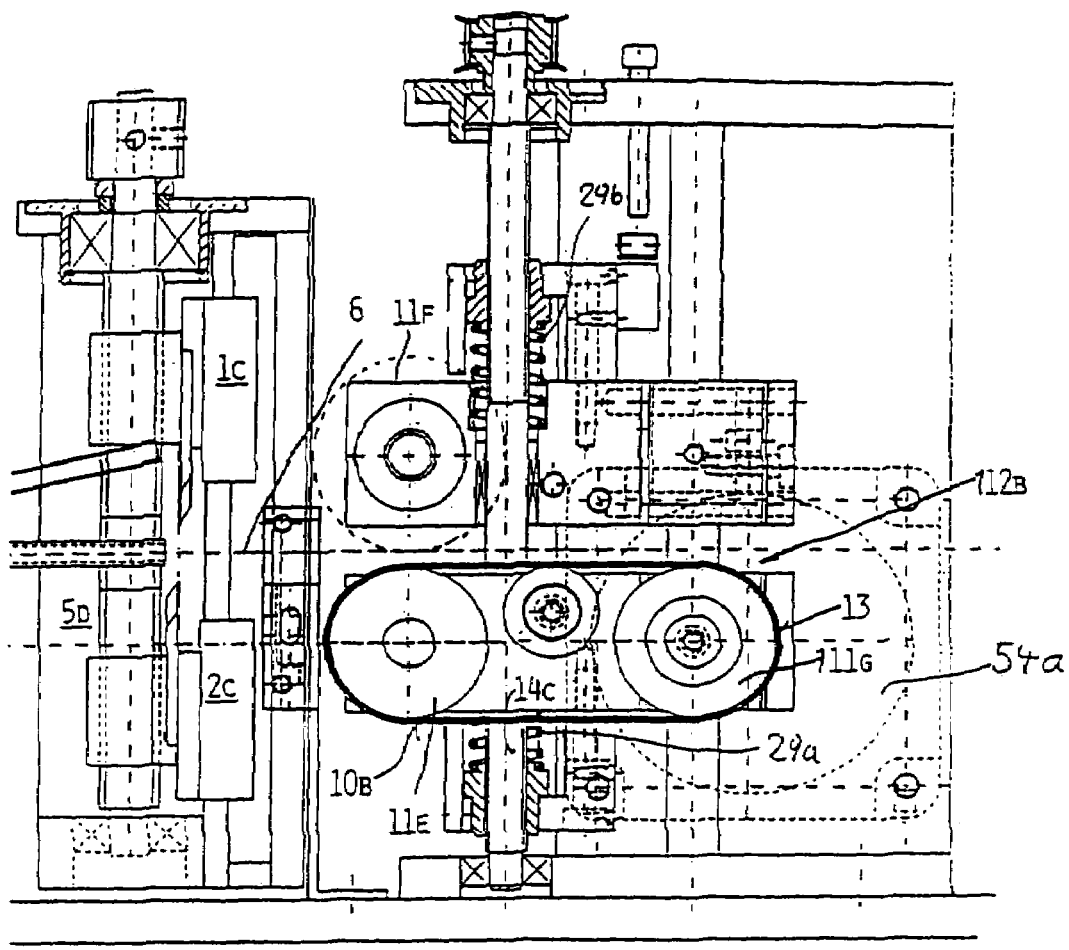
Figure 15:
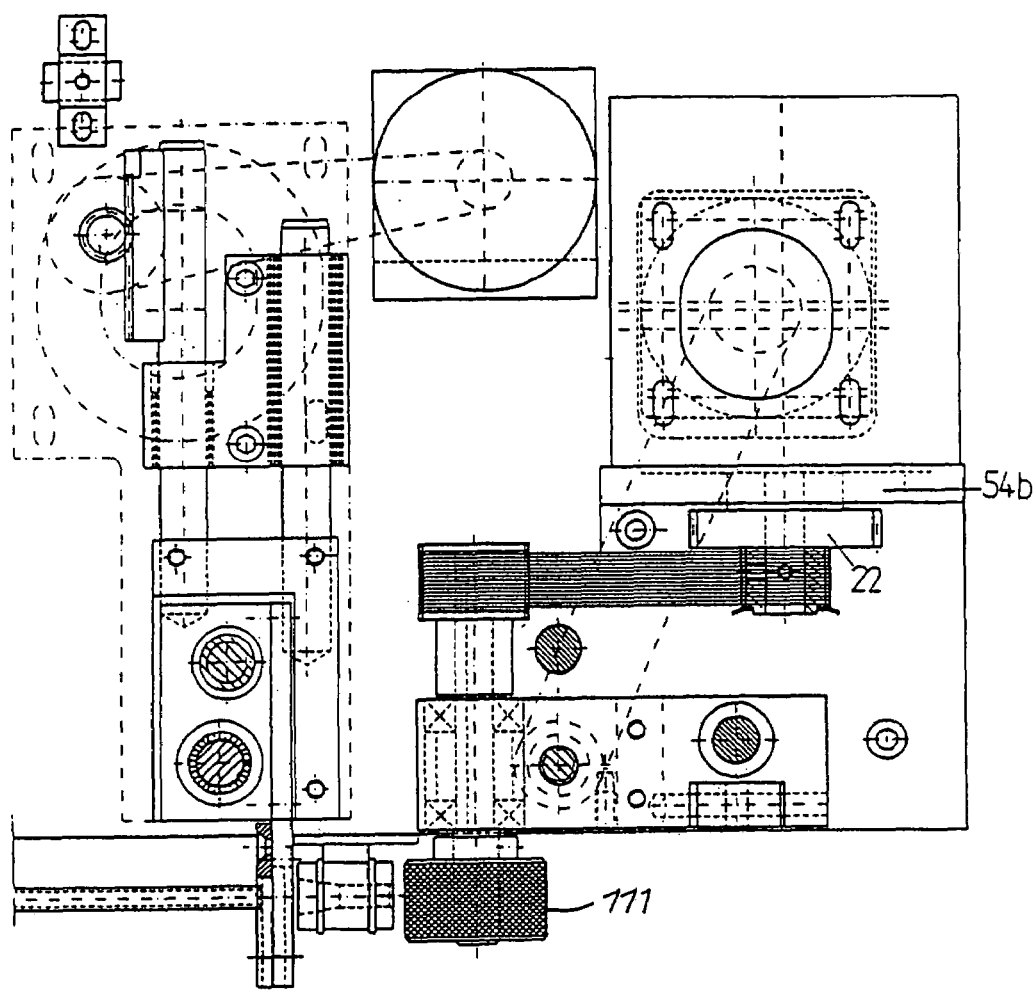
Figure 16:
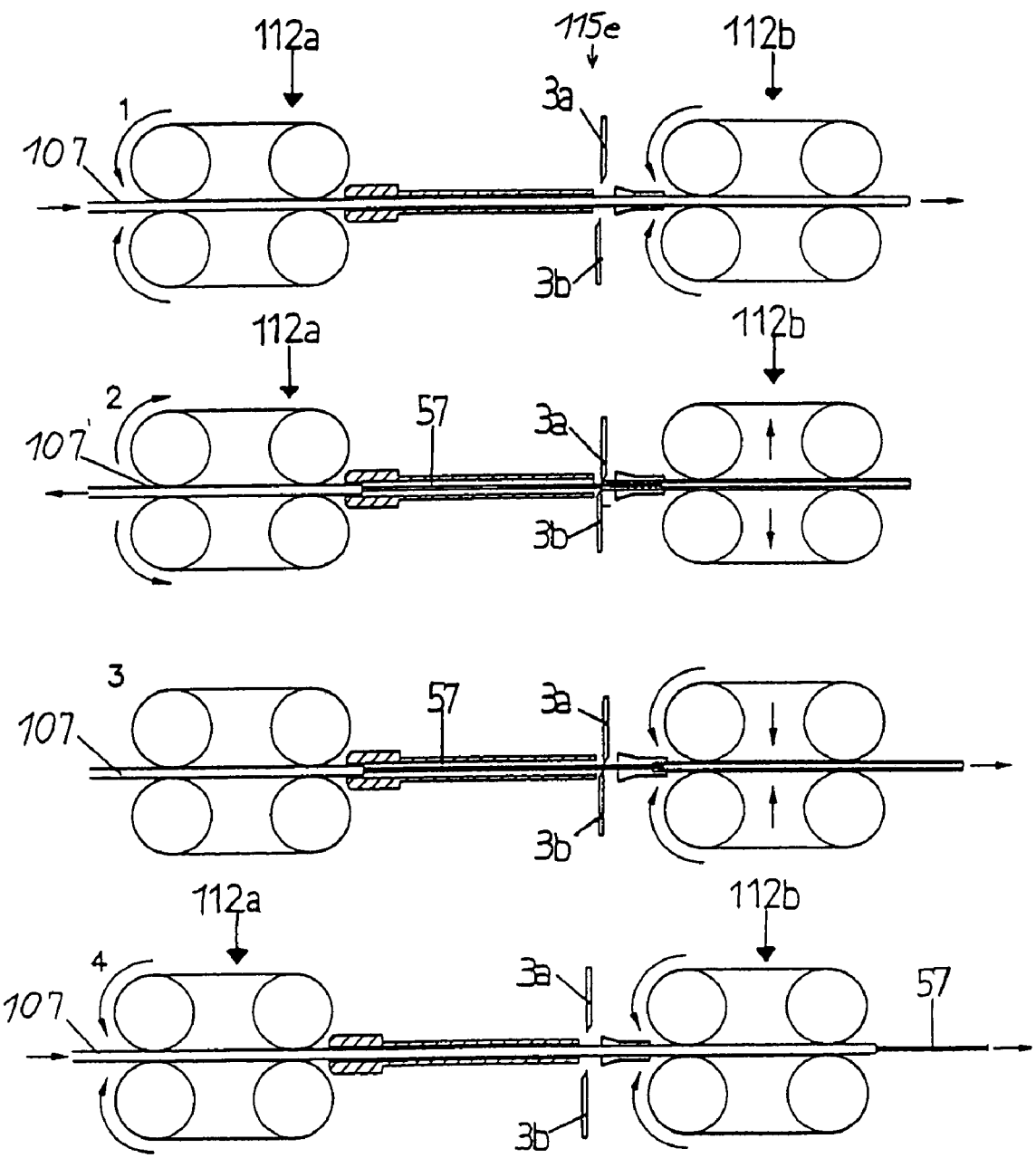
Figure 23:
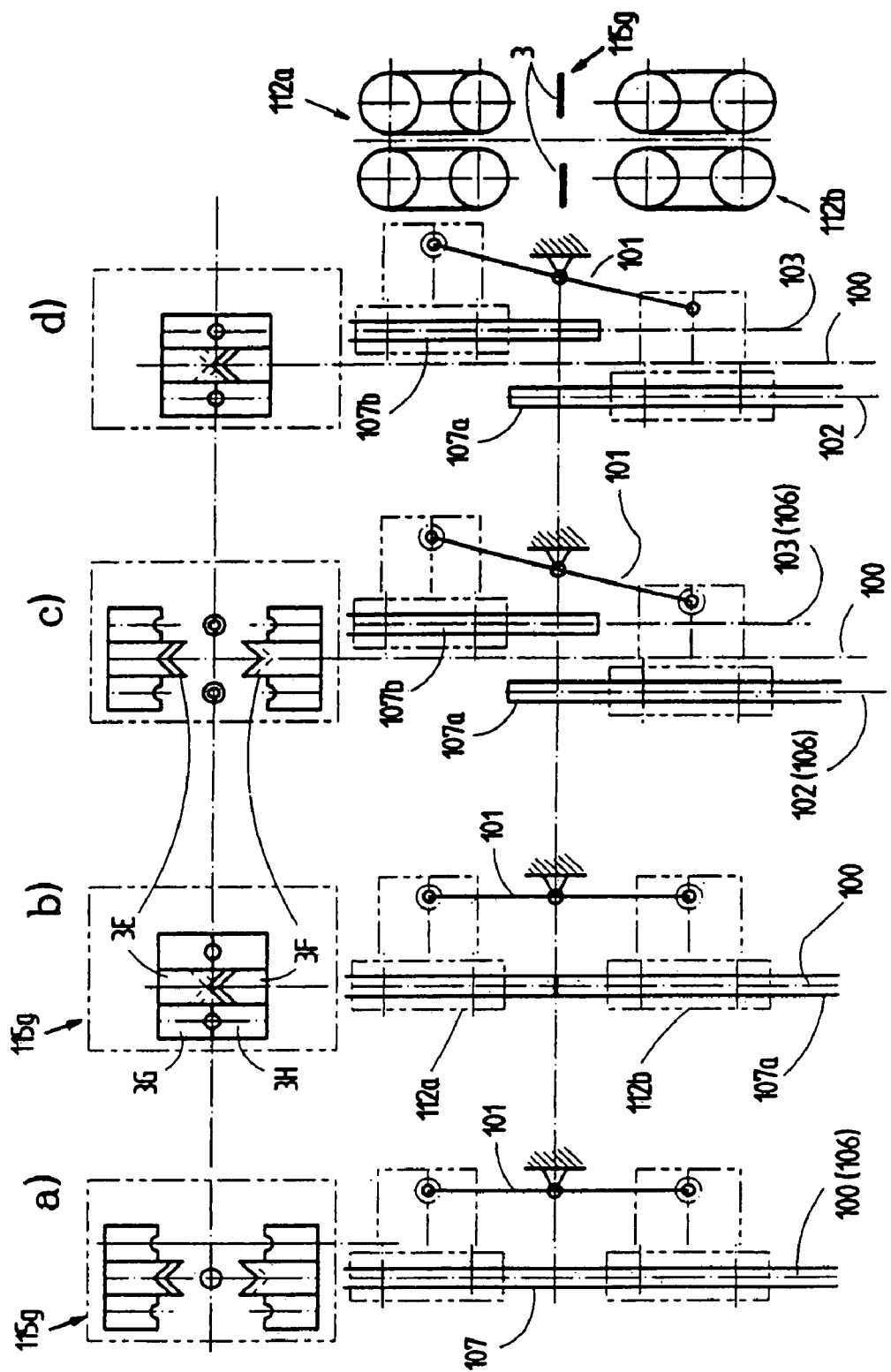
Figure 28:
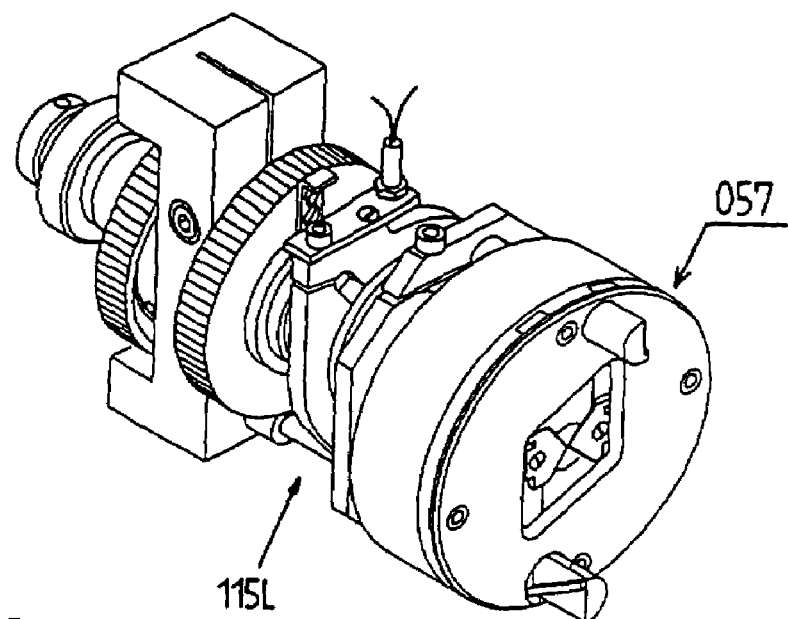
Figure 29:
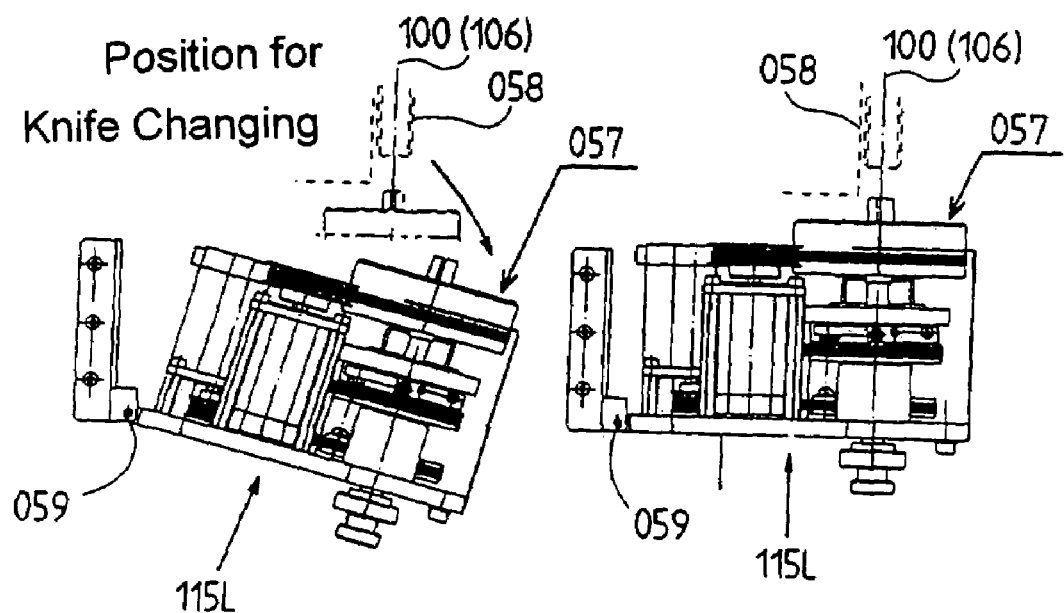
Figures 30, 31:
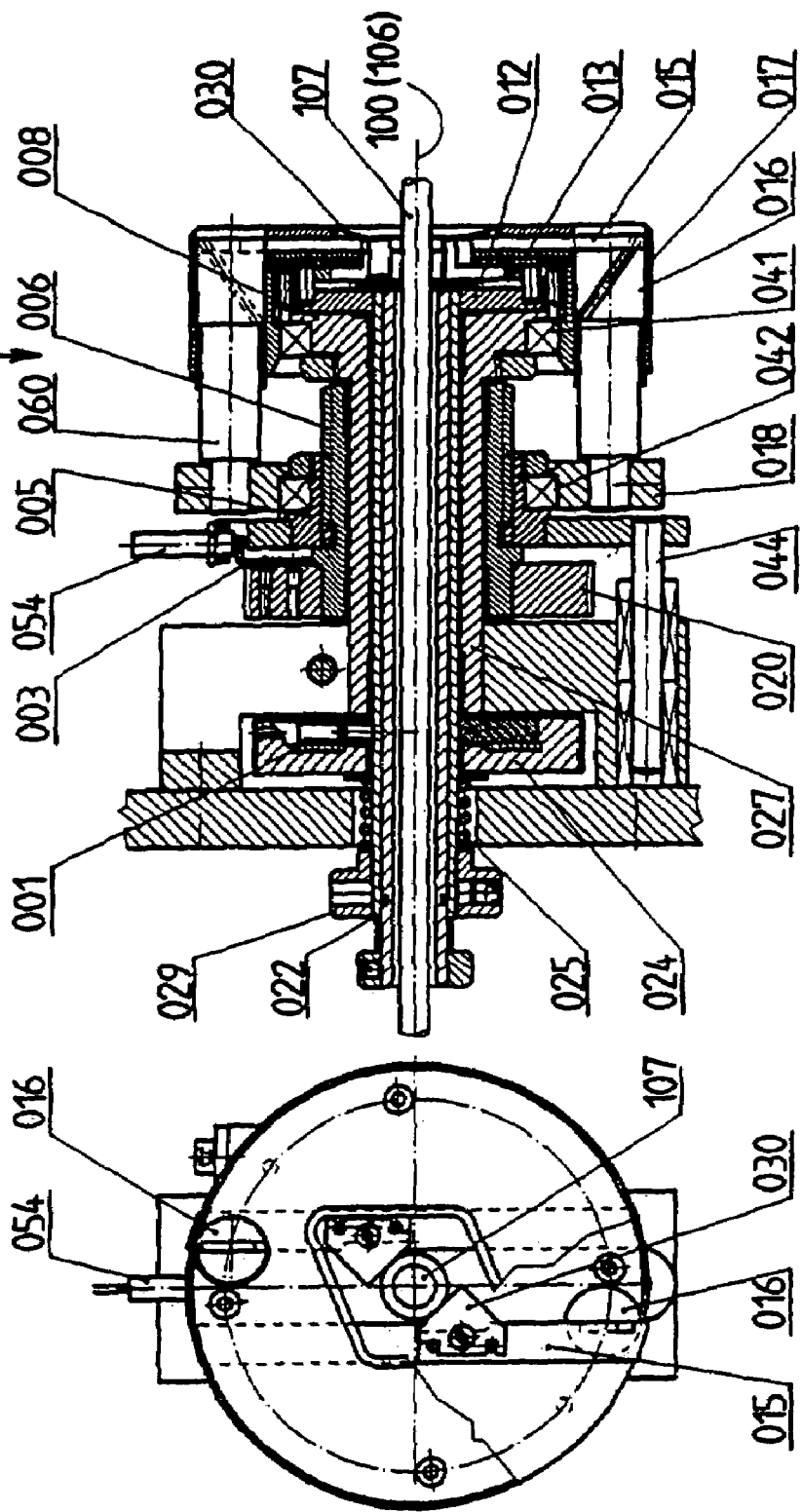

FIGS. 5a and b show a series of 8 different process steps of an insulation stripping process according to the invention on a schematically represented structure with novel sliding guides;

FIG. 6 shows a detail of a tool holder feed according to the invention of one variant;

FIG. 7 shows a section of a novel insulation stripping machine having sliding guides according to FIG. 5;

FIG. 8 shows a variant having a larger distance between front and rear continuous belt drive 12 with dimensions of a specific embodiment which are varied by about ±25-75% in the context of the invention;

FIG. 9 shows a variant having a shorter distance and the resulting effects with values which can be varied by about ±25-75% in the context of the invention;

FIG. 10 shows a group of different tools which can be optimally used in the invention and have different applications known to a person skilled in the art;

FIG. 11 shows the left part of a plan view of an apparatus having a belt drive 12 (plan of FIG. 13) and a pivot drive for the guide;

FIG. 12 shows the right part of the same plan view;

FIG. 13 shows analogously the left part of an incomplete view with upper belt removed and with a pivotable cable guide before the tools;

FIG. 14 shows a variant of a right part of this view;

FIG. 15 shows a variant of FIG. 12 with roller drive;

FIG. 16 shows process steps according to the invention for stripping insulation from larger lengths;

FIGS. 17 to 20 show schematic representations for illustrating a process according to the invention for programming the control;

FIG. 21 shows a detail of a knife drive of a station according to FIG. 28;

FIG. 22 shows a schematic structure having a transverse transport facility for the cable;

FIG. 23 shows a schematic representation of transversely displaceable transport units;

FIG. 24 shows a variant of FIG. 23 having combined transverse displaceability of transport means and knife station;

FIG. 25 shows a realistic structure according to FIG. 23;

FIG. 26 shows the structure according to FIG. 25 in the transversely swivelled state;

FIG. 27 shows a structure having transport units displaceable independently of one another;

FIG. 28 shows a knife station having rotatable knives;

FIG. 29 shows the station according to FIG. 28 as a mounted module in the swivelled-out state and in the operating state;

FIG. 30 shows a front view of the station according to FIG. 28;

FIG. 31 shows a section through the station and

FIG. 32 shows a detail of the centering jaw control in the station.

DETAILED DESCRIPTION OF THE INVENTION

Figure 1:
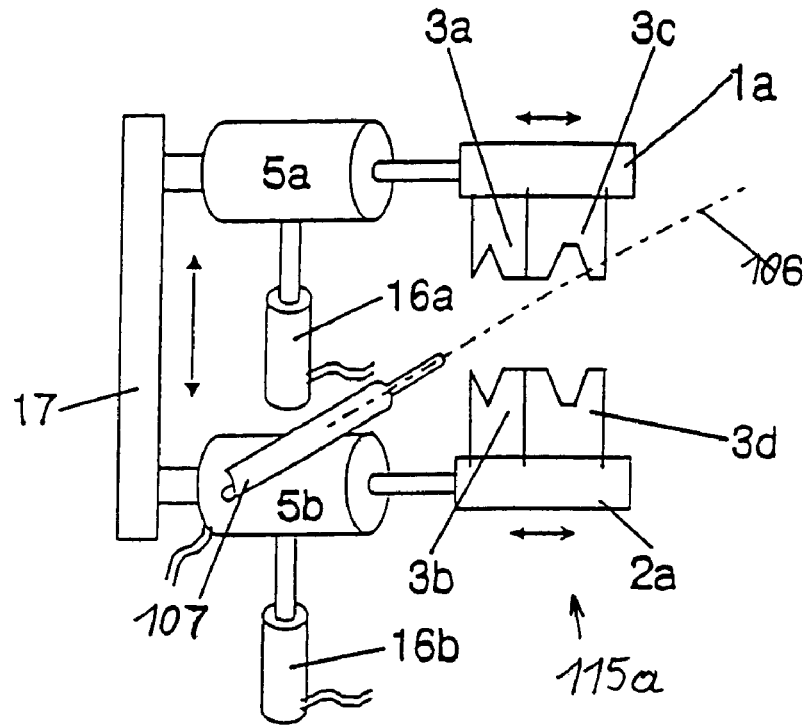
FIG. 1 shows a schematic oblique view of a novel apparatus.

FIG. 1 shows a schematic oblique view of a novel apparatus according to the invention, having tool supports 1, 2 and knives 3 which are held thereon and a plurality of which (more than the 2 pairs shown) may be mounted side by side on larger tool supports 1, 2. Schematically shown drives 5a and 5b drive the tool supports laterally relative to the axis 106. Schematic closing drives 16a and 16b enable the tool holders 1, 2 to be closed together (via a control) or separately. A guide 17 keeps the tool supports or tool holders and the drives parallel.

Figure 2:
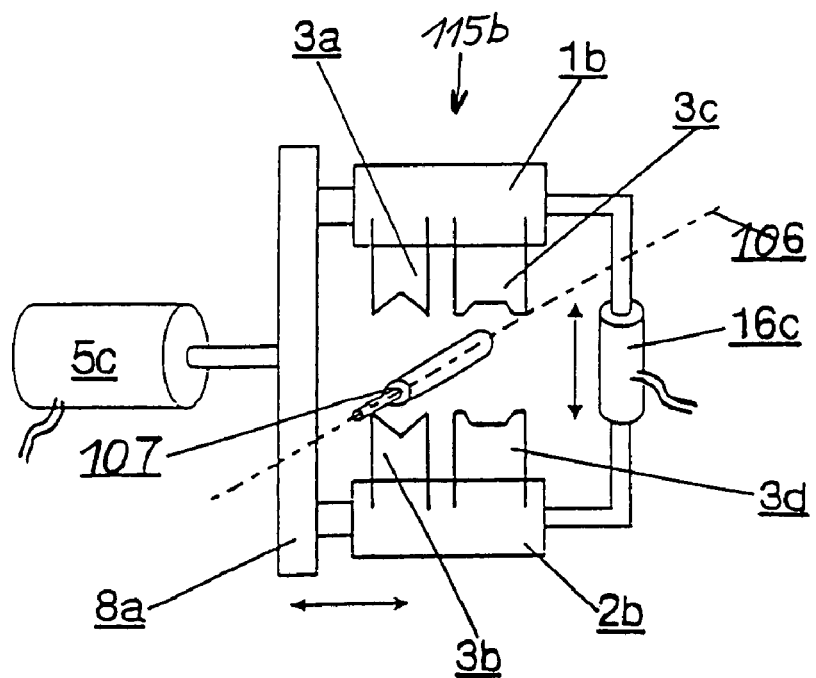
FIG. 2 shows a variant thereof with jointly guided upper and lower tool holders.

FIG. 2 shows a variant thereof having upper and lower tool holders 1, 2 jointly guided via a closing drive 16c, for example by means of a spindle drive and a single lateral drive 5c. This simplified variant is compact but—in comparison with the first one—permits only a few operations.

Both above-mentioned Figures refer to an important aspect of the invention, namely the virtually completely free mobility of at least one cable processing tool, in particular a knife or the like, in a plane approximately perpendicular to the cable feed direction. The mobility might also be continuous if required.

Figure 4:
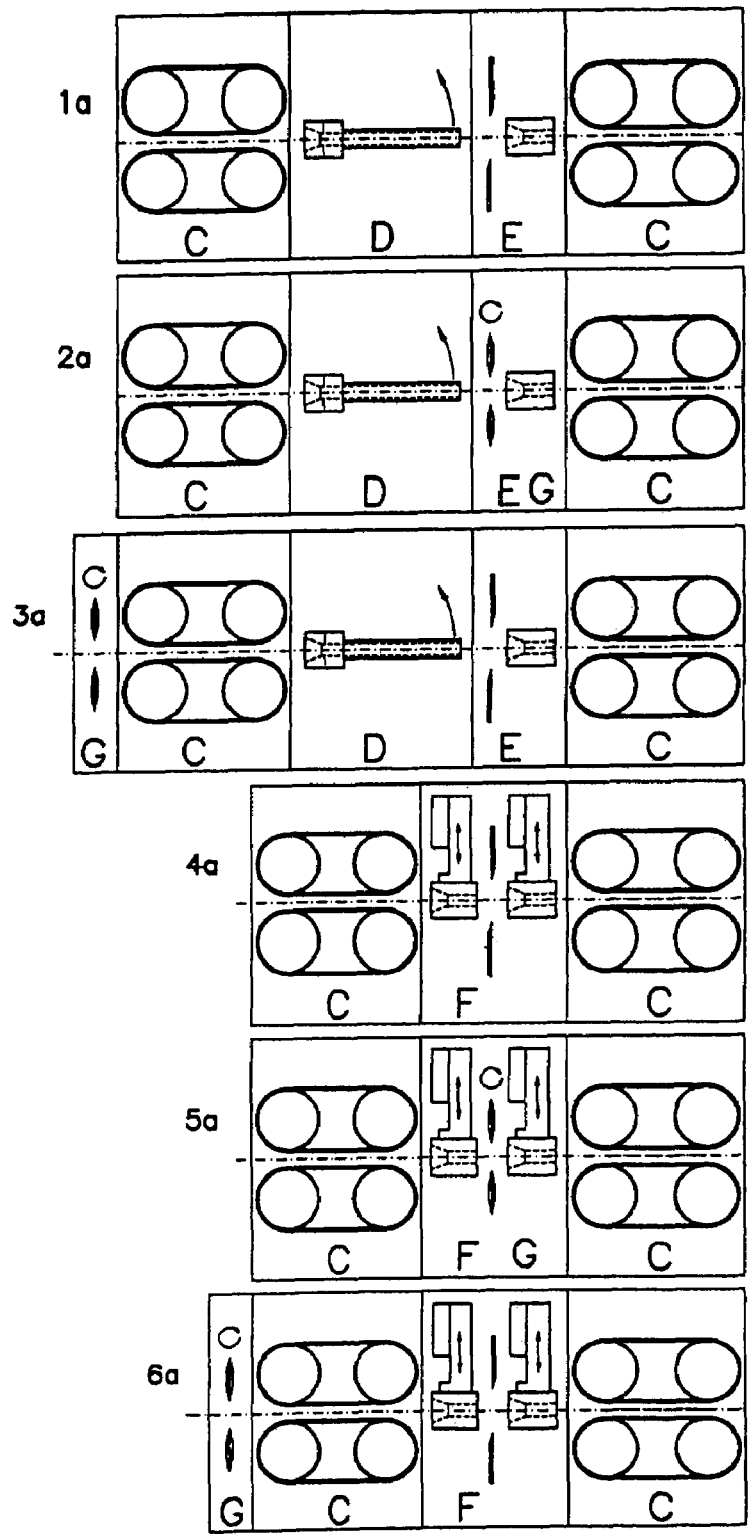
FIG. 4 shows symbolic examples according to FIG. 3 but with a belt drive.

FIG. 3 refers to an independent novel aspect of a modular design of an insulation stripping machine, but an aspect which can preferably be used in above cable processing machines. Examples 1b to 4b schematically show feed modules A and B having rollers, which however could in some cases also be replaced, for example, by other feed modules, for example a feed module C having belts according to FIG. 4, so that, for example, a feed module A is supplemented with a feed module C with omission of the module B.

A further frequently used module D having a pivotable guide tube is used before a blade or knife module E. The knife module is preferably designed as shown in FIG. 1 or 2, a further rigid or displaceable guide preferably being arranged. FIG. 11 illustrates the function of the pivotable guide tube.

As shown in Examples 3b, 4b and 3a and 4a, modules D and E can be replaced by module F which has at least one displaceable guide but preferably, as shown, two displaceable guides which permit a novel special insulation stripping process, as illustrated in FIG. 5a and b.

According to the invention, the insulation stripping apparatus can be supplemented by any desired further modules, a module G which represents a "coax box" being shown as an example, namely a rotating incision box and may be used in particular for coaxial cables. Such a coax box has been brought onto the market, for example, by Schleuniger AG under the name CA 9170, and its design will therefore not be discussed in detail. A person skilled in the art can readily adopt the relevant teaching from there. It is thus considered to have been disclosed in the context of this application. However, this application relates to a novel rotating cutting module which has advantages over CA 9170. It is distinguished in particular by a simple knife control and completely independently controllable centering jaws, as shown in FIG. 28.

What is important in this independent aspect of the invention is that a basic design is offered which makes it possible to meet the insulation stripping needs in a universal manner. The resulting advantage is primarily in the production, since the modules can be produced and stored in the factory independently of one another. Secondly, there is an advantage for the user, whose insulation stripping needs may change with time. By replacing the appropriate modules on site, the apparatus according to the invention can be subsequently adapted. The technical realization of this aspect lies in linear guides in the basic housing, which interact with diametrically opposite guides on the modules, so that the modules with their operating elements are concentric with the cable feed axis 106. In comparison with the prior art, this also permits faster assembly of complete insulation stripping or cable processing apparatuses.

The novel and advantageous process steps shown in FIGS. 5a and b constitute a third—optionally also independently applicable—aspect of the present invention. By means of short, in particular linearly displaceable guide sleeves 40a and b, the cable end sections are each held centered—advantageously—in the immediately vicinity of the knives before incision or insulation stripping by the knives 3a and b. For applications not described in more detail, it is of course also possible for the purposes of the invention to dispense with one of the two guide sleeves 40, in particular when the belt or roller feed is subsequently moved closer to the knives 3. A further variation arises through the possible replacement of a guide sleeve 40 by a module D, as shown, for example, in FIG. 16. The belt drive shown schematically as module C can be interchanged completely or partially with roller drives.

The inventive aspects of the invention which do not refer directly to the lateral displaceability of the tools are of course also applicable in an inventive manner to knife arrangements in which a plurality of knives 3 are arranged staggered along the cable axis (feed axis) 106, as, for example, in the insulation stripping model CCM 2000 of Sutter Electronic AG. Such combinations might make it possible further to increase the processing speed of cables by the process steps according to the invention and displaceable guide sleeves.

In an alternative design, in particular with utilization of the modular aspect, it is accordingly also possible to provide a plurality of knife modules F with laterally displaceable knives one behind the other. Variants having additional feed modules A, B or C arranged in between are also within the scope of the invention.

The invention furthermore relates to a novel measuring and adjusting apparatus for jaws which can be driven together by means of a motor, in particular cutter jaws on an insulation stripping machine. The novelty is the utilization of a certain elasticity between drive motor and an advance spindle which is responsible for advancing the jaws. The elasticity is generated by an elastic coupling member between drive motor and spindle, in particular a toothed belt which transmits the torque of the drive to the spindle via pulleys. A further novelty is that a transducer, in particular an encoder (shaft encoder), is mounted directly on the spindle. When the jaws are driven together, contact between the jaws is signalled to the encoder by virtue of the fact that the jaws no longer move together and the definitive stop position can thus be read or tapped from the encoder or a reset can be signalled. Owing to the elasticity, the drive motor, for example a stepping motor, can, however, continue to rotate slightly further according to the invention against the elasticity of the toothed belt, if only to absorb its motor force without imposing a mechanical load on the jaws.

According to the invention, the closing position of the jaws can also be deduced from the fact that one transducer (on the spindle) has come to a stop and the other (e.g. stepping motor) may still continue to rotate slightly. In addition or as an alternative, it is possible within the scope of the invention to reduce the torque of the drive motor in the vicinity of the closed position in order to reduce the mechanical load on the closing jaws.

An optional intermediate step according to the invention in stripping with the aid of the right belts with controlled contact pressure advantageously leads to complete stripping of long insulation pieces, with the advantage that jumping over the insulation stripping knives under strong retaining forces between conductor and insulation is reduced. However, this is a problem only in the case of thin cables; in the case of greater thicknesses and especially greater insulation thicknesses, known apparatuses as a rule otherwise lead to blocking of the left belt drive or to slippage which in turn may lead to destruction of the cable or of the left belts.

The completely individual adjustability and controllability of the front and rear rollers or belts facilitates the further processing of the cable but also requires adequately dimensioned drive motors and suitable software which, in the understanding of this patent application, is clear and realizable to an average person skilled in the art.

The preferred process steps in steps 1 to 8 are characterized by:

Feeding the cable 7 to its front insulation stripping length behind the knives 3; moving away the rear guide sleeve 40b.

Closing the knives 3 to the insulation stripping depth and withdrawal of the cable 7 by means of front module C.

Positioning the rear guide sleeve 40b, which simultaneously—if required—ejects the waste insulation piece so that it does not hinder the further procedure. It is precisely this procedure which is particularly advantageous over known solutions from Eubanks, which offers two-part guide sleeves which are intended to open for removing the waste and to eject the waste by means of an additional mechanism. Since these known attachments, however, subsequently close again, waste residues can actually now become jammed between the guide sleeve parts, which does not occur according to the invention. As a solution, another prior art envisages forming the sleeves to be open at the bottom so that stripped material can fall out downward. The disadvantage of this design is that cables, in particular thin, flexible cables, are not guided at their lower surface and faults may therefore occur during operation. Such guides are disclosed, for example, in the case of the insulation stripping model from Kodera/JP "Kodera 34".

Feeding the cable 107 up to the cutting position under the knives 3. In the case of a design according to FIG. 1 or 2, which is not obligatory for the use of this novel process, the insulation stripping knives 3 and the cutting knives 3 are arranged side by side on the displaceable knife supports 1, so that the cutting knives 3 are displaced to the cutting position between steps 4 and 5 while in the other steps the insulation stripping knives 3 are in the position shown.

The cable 107 is cut through.

The second cable section 107b is pushed back by means of the rear feed module C up to the insulation stripping position of the rear cable end; the front guide sleeve 40a is moved away. The latter has, inter alia, also the effect of making it possible to strip the insulation from a longer cable end section which exceeds the length between front module C and knives 3. Provided that it is flexible enough, this cable end section can in fact be bent since it is not laterally guided by the front guide sleeve 40a. The same effect can, if required, be utilized in steps 1-2, also at the front cable end and the guide sleeve 40b.

Incision and stripping of the insulation section (cable sheath waste or "slug").

Ejection of the cable section 107b stripped at both ends and feeding of the next cable section 107a according to step 1.

FIG. 6 shows a detail of a tool holder feed according to the invention (e.g. module E or F) of a variant according to FIG. 2 with a threaded spindle 18, a toothed belt drive 24 and the stepping motor 23 for controlled driving of the closing and opening movement of the tools and a schematically indicated drive 5 for lateral displacement of the knife holders 1 and 2. With regard to the insulation stripping steps 4 and 5 according to FIG. 5, the pair of knives 3e and f are used, whereas the die blades 3g and h merely cut into and strip off the insulation. The die blades 3g and h are preferably so compatible that they support one another and over cutting is thus impossible.

This compatibility, as is also already known in the case of other known insulation stripping machines, leads to an adjustment problem, which is solved, according to the invention, by another aspect of the invention, independent of the other aspects. In the case of inaccurate setting of the drive with the motor 23 or in the case of different knife inserts in the knife holders 1 and 2, the motor force may result in undesired forces on the spindle 18 or on the knife holders 1 and 2 if in fact the motor 23 applies further torque when the knives 3g and h rest against one another.

This problem is avoided by a shaft encoder 41 directly on the spindle 18. The encoder, together with a control not shown, has the task of monitoring the rotary movement of the spindle 18 as a function of the drive or rotary power of the motor 23. If the motor continues to apply torque without the spindle 18 rotating (no change in the encoder value), the control independently detects that the knives 3g and h are abutting one another. The elasticity of the toothed belt 24 permits a certain play which avoids mechanical overloading of the spindle. In a special embodiment, the encoder of the motor 24—e.g. a stepping motor—is also used for comparison with the encoder 41 in order to detect the closed knife position. An initial sensor 42, for example an inductive sensor, may be provided in order to detect the open position of the knife holders 1 and 2.

FIG. 7 shows a module F by way of example in more detail. The guide sleeves 40 are preferably held in holders 43 on guide rods 44 which can be raised or lowered by—in this example pneumatic—drives 45 under computer control. According to the invention, the holders permit rapid changing of guide sleeves 40 in order to adapt them to various cables. The guide sleeves 40 are preferably countersunk in a funnel-shaped manner in their interior at one or both ends to facilitate cable introduction. For certain applications, they may, as already mentioned above, be replaced with conventional pivot guides or completely omitted. According to the invention, they can also be successfully used in any other insulation stripping machines; for example, also in conventional rotary insulation stripping apparatuses, instead of co-rotating centering jaws, such as, for example, in the models 207 from Schleuniger Productronic AG or the models 9200 from Eubanks Monrovia, USA, which have now been taken off the market. Between the guide sleeves 40 are the knives 3 or the cable processing tools, and optionally a compressed air blow-out orifice 46 for cleaning the tools.

FIG. 8 shows a variant according to modular design 1a (FIG. 4) with a larger distance between front and rear continuous belt drives 112 with dimensions of a specific embodiment which can be varied by about ±25-75% for the purposes of the invention. The pivotable guide 9 permits long rear insulation stripping sections since, when a front cable section is pushed back, the guide 9 swivels upward and thus leaves free the path for the rear end of the front cable section, at least up to the length of the pivotable guide 9. The pivotable guide 9 is positioned opposite a guide 17 which may consist only of a flat guide piece for horizontal guidance of a cable, but which may also be displaceable, as described above, or may be formed to be rigid but replaceable, the above-mentioned snap fastenings also being advantageous according to the invention for this purpose. The length of these guide pieces or the distance between the knives and the belt or roller drives is usually critical for the smallest processible cable length. According to the invention, however, there is also a special short-mode operation in which the second pair of rollers or of belts is shut down in order to be able to process even shorter cable sections.

In contrast, FIG. 9 shows a variant with a shorter distance, such as, for example, modular design 3a (FIG. 4), and the resulting effects with values which can be varied by about ±25-75% for the purposes of the invention; of course, the belt drives 112 are replaceable in both variants by roller drives 111.

In a particular, novel inventive aspect which may also be used independently, the belt drives 112 can however also be used for stripping the cut cable sheath sections, the respective belts—as a rule these will be the rear belt pair—continuing to transport the cable sheath in the stripping direction by means of the contact pressure control, according to the invention, of the belt drives 112 as a function of the cable structure in case of closed insulation stripping knives which thus hold the cable. In a particular variant, the front belts, too, can run in the opposite direction and thus help to pull the conductor out of the sheath in a shorter time.

According to the invention, partial stripping operations with subsequent complete stripping with the aid of the belt drives, as described above, are possible as further process variants.

The modes of operation of the knife embodiments according to FIG. 10 are essentially known to a person skilled in the art; only attachments a-c will therefore be singled out:

In the case of particular attachments a), it is also possible to process in parallel a plurality of cables with the apparatus according to the invention, leading to greater effectiveness. According to the invention, parallel guides 40 or pivot guides 9 are then also provided for this purpose.

The particular attachment according to b) serves for stripping the insulation from flat cables, which can also be processed within the scope of the invention. Here, the flat blades according to b1) are preferably used for cutting.

The variant having the knives c) is likewise used for flat cables, and the latter can also be cut therewith.

The plan view according to FIG. 11 is compatible with the view according to FIG. 13. A front belt drive 112a with its drive rollers 111b and d transports a cable along the axis 106 to the pivotable guide 9. This has a guide tube 9b which is replaceably held in a pivot member 30b. The pivot member 30b is connected to a connecting rod 34 which transmits the pivot movement from the drive 33 to the tube 9b, while a stop 31 having a rubber buffer 31b for clamping is coordinated with the pivot body 30 or with the connecting rod 34, since the longitudinal guide 9 is preferably driven by means of a fast-acting displacement magnet 32 which accelerates the guide 9 abruptly by means of its slide 33, which may also be damped by means of a rubber buffer.

In the present embodiment, the connecting rod is formed in two parts, a straight pin 34a being held in a rotating shaft 34b and the latter in turn in a bearing 35 which is connected to the pivot member 30b. If required, this pivot guide may also be spring-loaded and/or may be arranged rotated about the axis 106 through 90 or 180 degrees, so that the guide 9 does not swivel upward but swivels out laterally or downward.

47 denotes an adjusting drive for the belt drive 112, which turns the spindle 14b by means of a belt 48.

FIG. 12 shows the right part of the same embodiment, 25 denoting the drive and 24 the belt for adjusting the tensile force of the continuous belt drive and 26 denoting the controlled (stepping) motor which permits controlled lateral guidance of the tool holders 1, 2 in the linear guides 27.

In this embodiment, the guide 40b is not displaceably held but is held by means of holder 43b so that it is readily removable. A common retaining part 8b displaceable by means of drive 5d carries the tool holder 1.

FIG. 13 shows a detail of the belt drive 112a for the novel apparatus having a continuous belt pair 112 with belts (toothed belts) 13, rollers (toothed rollers) 111a, c and pressure rollers. The upper and lower belts can be separated completely from one another. The contact pressure between the belts 13 is controlled by means of the pressure spring 29 which holds the drive roller retaining member 50 under initial tension in the closing direction. The initial tension is increased by turning the spindle 14b further in the closing direction with upper and lower belts 13 touching one another, so that the lock nut 51b further compresses the spring 29. On opening the belt drives, for example for preliminary opening to avoid damaging contact between a cable and the belts 13, the lock nut 51b drives the drive roller retaining member 50b by means of the driver part 52b.

The opening movement is limited by means of adjustable stop 53. In this position, the closing movement is preferably simultaneously initialized. The control is effected either by means of a shaft encoder (not shown) on the shaft 14b or by means of the controlled drive 47 according to FIG. 11.

In the variant according to FIG. 14, the drive motor 54 for the belt drive is indicated by a dashed line and is preferably likewise encoder-controlled since it plays a role in determining the insulation stripping lengths.

FIG. 15 shows a variant of FIG. 12, having a roller drive with rollers 111 which are driven by a drive 54b via a gear 22 or 21. The opening adjustment of the rollers corresponds to that of the belt drives 112.

FIG. 16 relates to a further novel and inventive process for stripping insulation from cables, which could preferably be carried out using the attachments described above, but also with other known machines in a novel manner. In four process steps, a cable 107 is stripped of a particularly long insulation section:

Inserting the cable 107 by driven revolution of the belt drives 112 up to the insulation stripping position under the knives 3.

Opening the right belt drive 112b to the cable diameter so that the cable is just held centered, but without exerting a contact pressure thereon. At the same time, incision by the knives 3 to the insulation stripping depth; withdrawal of the cable 107 by backward revolution of the belt drive 112a to about the position in which this belt drive 112a does not yet touch the bare conductor 57. This would be an insulation stripping length which could be achieved to date only by means of expensive partial stripping steps.

Clamping the cable 107 by the belt drive 112a and revolution of the belt drive 112b for stripping with suitable contact pressure on the cable sheath, so that the latter is stripped completely from the conductor 57. Compared with the known apparatus, complete stripping of an insulation stripping length shown is thus now also possible.

A person skilled in the art recognizes that further steps would be possible.

A particular process for controlling the insulation stripping apparatuses described above or other insulation stripping apparatuses which are not within the scope of the above embodiments is likewise the subject of this application.

The object of the process is to improve, in particular to accelerate, processes known per se for controlling insulation stripping apparatuses, so that internal sequences are optimized and certain functions automated and optionally the input is further facilitated.

Known processes for control have software which, when processing special cables (e.g. coax cables), offered the possibility of manually inputting each individual operation, i.e. each process step, each individual feed or withdrawal, for example of the cable or of the knives, each pivoting of a pivotable cable guide part, etc. and of thus programming the software in such a way that it subsequently appropriately controlled the machine. This required "complete" programming of the entire insulation stripping process for each new detailed problem in stripping the insulation from a special cable. This is time-consuming and may also be liable to errors owing to mistakes.

The present invention solves this problem satisfactorily for the first time by introducing groups of operations which combine process steps and automatically make certain adjustments group by group. Each process (step) group performs a frequently required task which consists of a plurality of individual process steps, for example successive incision and feeding of a three-stage cable on one side with adjustable insulation stripping depths.

According to a further development of this process, the individual process steps in a group of operations or the associated values can be set to 0 or can be replaced by other, random values, making it possible to generate a new, alternative group of operations. This makes it possible for the user to store each special cable as a group of operation groups in a database, in which he can subsequently simply select the cable by means of a command.

According to a further development of this invention, such groups of operations may also be combined to overlap (for example to form larger groups of operations), in order automatically to solve more complex insulation stripping problems (for example, cables having an extremely large number of insulation stripping stages).

This therefore results in modular blocks of process steps, which blocks are preferably each freely programmable by themselves.

As a rule, in the event of a cable change, a user need therefore only select one or other cable in the database in order to control the stripping of insulation from the cable in the desired manner.

According to a particular embodiment of the invention, the program (module) groups are shown on a display. FIG. 17 shows an example of such a display, together with the scheme of a desired stripped cable section. The cable and its processing operation groups are shown schematically on the display. A menu bar is also shown.

Completely normal three-stage stripping is shown on the far left in the scheme. This is followed by the fourth stage of stripping, consisting of a slotted window without left end and without slit, which is partially stripped over a large length. The next operation comprises a text. This is followed by the right end: complete stripping. This comprises repeated stripping in one piece (there are other possibilities, but this is the recommended one). This end is additionally processed (e.g. crimped) by an external device.

The individual operations are thus shown schematically in succession. The individual operation symbols may not be completely displayed, but in each case the selection which the user chose by inputting the parameters. The cable contains empty parts at most at the end. If it consists of few operations, it will simply be shorter. A very large number of operations may lead to the cable being scrolled. The display jumps about half a screen in each case. The display is not true to scale either in X or in Y.

Two bars are shown below the cable. The upper, thick bar indicates which operation is currently being actuated by the user (for choice of other operations, see under Keys, Enter and Back): the thinner bar or bars shows or show which operations are currently overlapping the actuated ones. Those which do not at all overlap are not shown (such as the text); others which end somewhere within the first, end in the middle; those which end in the same place as the thick bar actually end there; and those which extend beyond (such as the stripping of the outermost layer) also extend beyond the thick bar. Up to two overlaps per side are shown, and further ones are indicated by three dots on the appropriate side. Operations which lie completely one under the other are shown as a line of half length in the middle of the other operation.

The selection menu for the operations of one end is shown underneath. Details of the menus are shown, for example, as follows:

Various menus are available for selection. One menu (End menu) is activated when the user is at one end of the cable. The other menu (Middle menu) is activated when the user is not at one end of the cable. For a list of operations and the functions controllable thereby, see further below. If one of the appropriate keys is pressed, a new operation is introduced.

Figure 18:
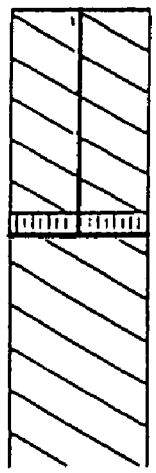

FIG. 18 shows and describes, by way of example and schematically, possible groups of operations for processing the cable end, while FIG. 19 provides information, by way of example, on groups of operations for the middle part.

FIG. 8 shows a universal guide 17 (only horizontal guidance). This is, if required, adapted to the cable diameter. A guide 9 which can be swivelled away is, if required, adapted to the cable diameter.

The cable sections shown relate to the following processing possibilities: processing in short mode if L is less than 52 mm, processing in special mode if right insulation stripping length is greater than 50 mm. The insulation can also be stripped off in several sections. The advantage of this variant: it is faster than the variant according to FIG. 9 and it permits greater left and right stripping length. Disadvantage of this variant: the cable swivels out with guide 9. Short coax cable sections cannot be processed.

FIG. 9 also shows one universal guide 17 each on both sides (only horizontal guidance). It is adapted to the cable diameter. It can be swivelled away. The cable sections shown relate to the following processing possibilities: processing in short mode if L is less than 52 mm; processing in special mode if right insulation stripping length is greater than 50 mm. The insulation can be stripped off in a plurality of sections. Advantage of this variant: no swivelling out of the cable; processing of relatively short coax cable is possible. Disadvantage: slower than variant according to FIG. 8; max. 50 mm stripping length on the left side; max. 50 mm complete stripping on the right side.

The processing facilities indicated on the screen shown by way of example in FIG. 17 are schematically represented in FIG. 18. The operations have the following special features according to the invention:

Terminating: Stops until the input signal (robot) indicates completed processing.

Coax slit: Always displayed; however, processing takes place only if a coax box is also set in the system parameters. This is so that it is possible to inspect coax wires quickly even if no coax processing is to be performed. A person skilled in the art understands coax box as meaning an additional module with rotating knives for cutting into coaxial cables.

Coax steps: Can be used for stripping up to three steps (four layers). Stripping for the appropriate steps can also be defined here.

Cutter strip: Permits multiple stripping (without coax, whereby coax operations can be positioned "independently" thereof at the desired point). However, this may also be one-part stripping—both complete and partial stripping are possible. It is also possible to define multiple windows (free windows in the cable). The graphics for Cutter strip show the process first as a procedure, with the result underneath.

Cutter slit: Permits the definition of a slotted end with tearing of the insulation for easier removal.

Since each individual operation can be omitted, various possibilities are available for selection (see below). This process is analogous to operation 2, except that the knife head is used instead of the coax box.

6) Cutter steps: Can be used for stripping up to three steps (four layers). Stripping for the appropriate steps can also be defined here. As for operation 3, except that incision is performed with the knife head instead of with the coax box.

The operation groups in the middle part according to FIG. 19 permit their positioning in each case starting from the left or right end. This results in the following special features according to the invention:

Stopping: Stops until the input signal indicates completed processing.

Marking: Marks an area with a number of texts. It is also possible to mark a single text.

Coax slit: Permits the definition of a slotted window with two-sided tearing of the insulation for easier removal.

Cutter slit: Permits the definition of a slotted window with two-sided tearing of the insulation for easier removal. Since each individual operation in 3 and 4 can be omitted, this makes the procedure versatile. As for operation 3, except that incision is carried out with the knife head instead of with the coax box.

Various basic operations according to the invention for the ends are shown in FIG. 20a-20e:

FIG. 20a schematically shows a basic operation.

Figure 20B:
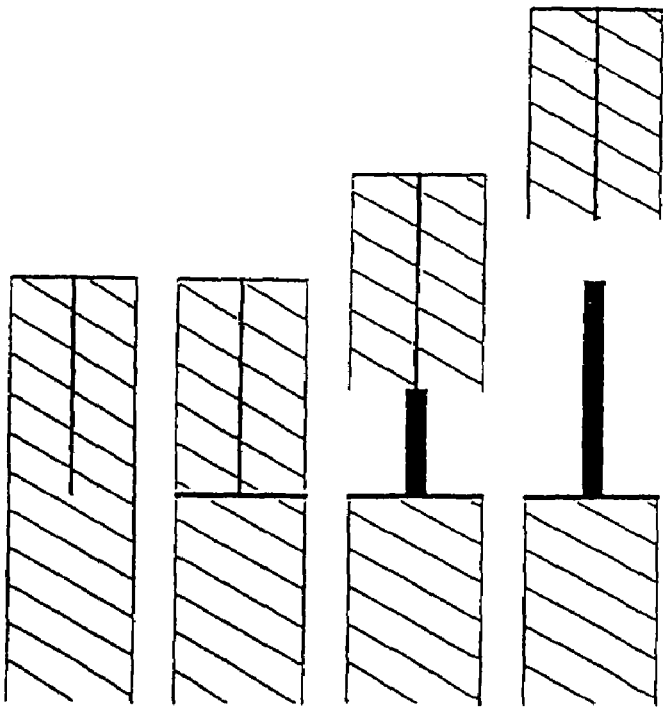

FIG. 20b shows, in the upper diagram, a basic operation with coaxial incision, longitudinal cut and stripping with the knife head, the codes beginning with SPE being cable-specific and/or operation group-specific.

Figure 20C:
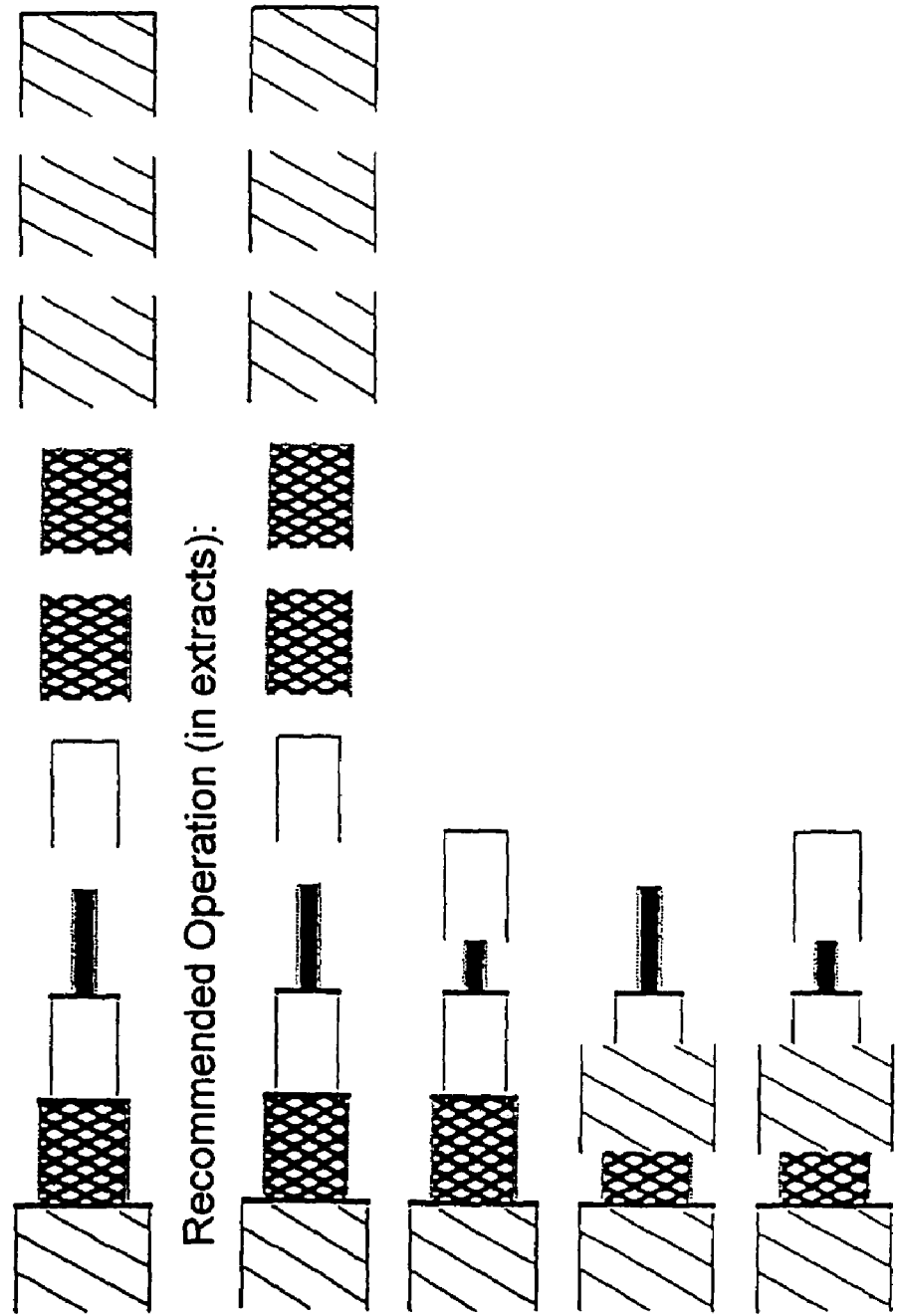

FIG. 20c shows a basic operation with first coaxial incision, second coaxial incision, third coaxial incision and the corresponding insulation and layer stripping, beginning from the diagram with the shallowest incision through stripping with the next deepest incision to stripping with the deepest incision. The recommended operations are shown schematically underneath in extract form.

Further variants are: also incision in two stages or one stage or omission of individual cuts and associated strippings or omission of each individual stripping of all of the total of six possible ones.

FIG. 20d shows a further basic operation for cutter stripping with the following steps: 1. outer incision, 2. stripping to the outermost incision, 3. next incision, 4. stripping to this incision, . . . . The following parameters must be input: first incision position: length of all sections (one value only), length of the first strip, length of all other strips (one value only).

FIG. 20e shows, in the upper diagram, a schematic basic operation for marking. The lower diagram schematically shows a further operation according to the invention. This is an operation involving a coaxial window with the following process steps: 1. right coaxial incision, 2. left coaxial incision, 3. longitudinal slit, 4. right stripping with the knife head, 5. left stripping with the knife head.

A schematic embodiment for the transverse transport of cables to other further processing stations is shown in exemplary FIG. 22, which does not restrict the various aspects of the invention. The Figure shows a perspective view which schematically indicates some components of a cable processing apparatus—comprehensible to a person skilled in the art.

FIG. 22 shows a first and a second transport means 112, 113 of a cable transport apparatus for moving and holding a cable 107. The cable transport apparatus comprises, in addition to the transport means 112, 113, for example, a cable roll with a stock of cable, a guide means for controlled feeding of the cable 107 from the cable roll to the first transport means 112 and a receiving apparatus for receiving the cable sections, cut to length and processed at the ends, from the second transport means 113. The two transport means 112, 113 each comprise at least two rolls which can be pressed from opposite sides against the cable 107 and of which at least one is driveable so that the cable 107 can be moved forward, or away from the stock of cable, or backward, depending on the direction of rotation. When the rolls stop, the cable 107, too, is held without movement.

In the embodiment shown, the transport means 112, 113 each comprise an upper and a lower belt 4 and 5. These belts are each guided around two rollers 6. Of an upper and lower interacting belt pair, at least one belt can be driven in both directions. For this purpose, for example, one of the rollers 6 or a further roller acting on the belt is connected to a drive. The rollers 6 of the belt 4 or 5 are each rotatably mounted on a roller frame 7. The roller frames 7 are in turn mounted in U-shaped holding carriages 8, at right angles to the longitudinal cable axis, to permit parallel displacement. As a result of the movement of a roller frame 7 with the rollers 6 of the upper belt 4 upward or downward, and correspondingly of a roller frame 7 of the rollers 6 of the lower belt 5 downward or upward, the receiving area for the cable 107 can be enlarged or reduced. To activate the displacements of the roller frames 7 and to achieve a contact pressure between the belts 4, 5 and the cable 107, actuating elements 9 are preferably arranged between the holding carriage 8 and each roller frame 7.

Each holding carriage 8 is displaceably guided along a track transversely to the longitudinal cable direction by means of a guide. The embodiment shown provides, for each holding carriage 8, a linear guide in the form of a rail 10 whose guide profile 10a is engaged by a corresponding guide part of the holding carriage 8. In order to move the holding carriages 8 along the rails 10, for example, one stepping motor 11 each is provided, each of which sets in motion a cable 13 by means of a drive wheel 12. One end of the cable 13 is connected directly to the holding carriage 8 and the other end is connected via a deflecting roller 14 to the opposite side of the holding carriage 8 to form a continuous belt by means of which the carriage 8 can be moved in both directions.

Of course, it is also possible, if required, to provide pivot guides instead of linear guides for the holding carriages 8. The guide means for controlled feeding of the cable 107 from the stock of cable to the first transport means 112 must ensure, for the possible displacements or swivel movements of the first transport means 112, that the cable 107 is not curved more than desired. If necessary, the cable roll with the stock of cable is moved together with the first transport means 112 or its holding carriage 8 so that the cable 107 always directly reaches the first transport means 112.

At least one knife station 115 and, for example, a further processing station 16 or 17 is arranged between the first and second transport means 112 and 113 or the rails 10. To produce cable sections 107a, b, the cable 107 is guided from the first transport means 112 through the knife station 115 to the second transport means 113. Two cutting tools 3 can be moved together for cutting through the cable 107. The knife station 115 comprises, for example, a knife frame 19 in which the cutting tools 3 are guided and on which movement elements 20 for actuating the cutting tools 3 are fastened. If necessary, a centering guide 21 which may be movable by means of a linear guide 22 on the knife frame 19 is provided for guiding the cable 107 from the first transport means 112 to the cutting region. The displaceability of the centering guide 21 makes it possible to feed the cable 107 with or without the centering guide 21 to the cutting region. If the cutting region also includes sections for insulation stripping, the centering guide 21 can be displaced, for example, parallel with the first transport means 112. Preferably, centering apparatuses are provided on both sides of the cutting tools 3, it being expedient during stripping of the insulation if the free wire end is not present in a centering guide 21. The centering guide 21 is actuated by means of an adjusting drive 23.

In order to reduce in relative terms the processing time also with a knife station 115 for cutting and insulation stripping, the cutting tools 3 are preferably provided with a central cutting region and, on both sides thereof, with one insulation stripping region each, so that, after cutting, the resulting two wire ends can each be fed individually to an insulation stripping region by movements of the transport means 112, 113 in opposite directions. For insulation stripping, the two wire ends are each moved by a desired length through the knife station 115. The cutting tools 3 are then moved together for cutting the insulation layer and the two wire ends are drawn back again by the transport means 112, 113 from the knife station 115 for stripping the insulation. The shorter processing time is the result of the simultaneous processing of the two wire ends, which is permitted by the lateral displacement of the wire ends relative to one another. To permit any desired insulation stripping lengths, the lateral displacement is preferably chosen so that the advanced wire ends can be moved laterally past the opposite transport means 112, 113. If necessary, each transport means 112, 113 is assigned a lateral support region on which the advanced cable end, resting on the opposite side, is guided so that it is not curved downward in an undesirable manner even in the case of large insulation stripping lengths.

Analogously to the simultaneous processing of the two cable ends 107a, b in laterally staggered insulation stripping regions of the cutting tools 3, it is also possible to ensure simultaneous processing in any other desired processing stations 16, 17 arranged staggered laterally or transversely to the longitudinal cable direction. By means of the lateral displaceability of the transport means 112, 113, simultaneous or parallel processing is permitted. In addition, processing stations 16, 17, which are accessible only from one side for a cable end 107a, for example through an insertion orifice 16a, can be of any desired length or may also extend laterally along a transport means 112, 113 without this having an effect on the distance between the two transport means 112, 113.

If necessary, during the processing of one cable end 107a, b, the other is drawn back and the processing tool is moved transversely to the longitudinal cable direction toward the cable 107. However, this method of processing permits only serial processing of the cable ends 107a, b formed on cutting. Because this particular solution according to the invention eliminates the restriction to processing in the region of a single fixed cable axis 106, the processing can be accelerated and simplified. The acceleration is ensured by the parallel processing. The simplification arises because, in order to achieve freedom of movement of the cable end 107a being processed, no movements of the other cable end 107b need be performed.

It is clear that upward and downward mobility can also be provided instead of or in addition to lateral mobility of the transport means 112, 113. In other words, stations can be arranged distributed as desired about a central axis or a knife station, it being necessary for the transport means 112, 113 or their guide means to ensure that the cable ends 107a, b can be fed to the processing station. The movement of the cable end 107a, b upward or downward can, if required, be achieved by the movement of the roller frames 7 in the holding carriage 8 upward or downward. In addition, at least one transport means 112, 113 may also be displaceable in the longitudinal cable direction, so that, for example, it may be possible to dispense with a centering guide because the outlet region of the transport means 112, 113 can be guided directly to the entry region of the processing station 115, 16, 17.

The schematic diagrams in FIGS. 23 and 24 are self-evident, in FIG. 23 the lever 101 representing any desired actuator between the transport means. The fork according to FIGS. 25 and 26 serves as an example of such an actuator.

FIG. 24 on the other hand shows any desired actuator 101 between a transport means 112b and a knife station 115h. By simultaneous movement of the transport means 112b and the tools, it is possible to save transverse transport time.

In particular, FIG. 26 clearly illustrates a time-saving insulation stripping method by simultaneously stripping the insulation from the front and rear cable end 107a and 107b. This design is shorter than a design having a three-knife arrangement one behind the other, like, for example, Eubanks Model 9800.

FIG. 27 shows an independent transverse transport, for example along a drive roller axis 110 for the transport unit 112b. In FIGS. 25-27, the double-headed arrow indicates the mobility of the drive elements toward and away from one another.

The further FIGS. 28-33 describe another design according to the invention, which is used in particular as a "rotating box" in continuous cable processing machines. As a rule, it is added on as a module and used in addition to the knives which are generally not rotatable in such machines, in particular V-knives, in order to facilitate particularly hard insulations or multistage insulation stripping processes in the case of coaxial cables. The length measurement required in the case of this design is effected as a rule at the drive rollers or drive belts of the continuous cable, which are located on both sides of the rotating box and, in addition to feeding, also perform a clamping function and, if required, a centering function. FIGS. 28-33 are likewise described contiguously and in an overlapping manner.

Mounted by means of a rigid sleeve 027 is a hollow jaw shaft 022 which is connected by means of a coupling to brake disk 001 with a gear wheel 024 which can be driven by means of a toothed belt. The jaw shaft 022 transmits the torque of the gear wheel to a spiral flange 012 which engages centering jaws 013 by means of a pin. Since the centering jaws 013 are guided in a jaw guide 011, a rotation of the sprial flange 012 results in the clamping or centering jaws 013 moving together or apart. By means of adjusting nut 029, it is possible to tension a pressure spring 025 which influences the braking force between brake disk 001 and first gear wheel 024. The braking force decides on the contact pressure of the centering jaws 013 on the outside of the cable sheath. The centering jaws 013 have an L-shaped section so that they permit a very compact design and nevertheless offer a broad centering or clamping surface for cables to be stripped of insulation. Their ends project to directly adjacent to the knives. However, owing to their L shape, it also offers space for any guides or the like.

A bearing flange 008 which carries bearings 041 is arranged coaxially with the jaw shaft 022. The bearings 041 support a knife head which has wedge clamps 018 which are equipped in the region of a head flange 015 with wedges 016 which cooperate with diametrically opposite knife holders 015. The knife holders 015 are guided in a knife guide 010. A spindle 006 drives a nut 005 axially; subsequently, the wedge clamp 018, too, is longitudinally driven via a bearing 042. The spindle 006 can be driven by a second gear wheel 020 which has a position indicator 003 whose counterpart is connected to the nut 005. A straight pin 044 secures the nut 005 against rotation, so that rotation of the second gear wheel 020 results in an axial displacement of the nut 005 and hence an axial displacement of the wedges 016. This displacement causes the knife holders 015 to move in the closing or opening direction. However, other closing and opening apparatuses known to a person skilled in the art for knives and jaws are also within the scope of the invention.

FIG. 29 shows a plan view of a rotating box 057 according to the invention in a mounting position on the left and in the insulation stripping position on the right. The further attachment of a continuous cable insulation stripping apparatus 058, for example Schleuniger insulation stripping machine CS 9100 or a novel machine CS 9150 according to the invention, is indicated by dashed lines. Swivelling out of the insulation stripping position into the mounting position permits better access to the rotating box 057 in order, for example, to facilitate knife change. Swivelling out thus permits rapid working according to the invention. The module 057 is held on a hinge 059 which is screwed to the frame of the continuous insulation stripping apparatus 058. A conventional lock secures the module 057 in the insulation stripping position. This concept of the invention is not restricted only to rotating boxes but includes all modules of a continuous insulation stripping machine.

FIG. 28 shows an oblique view of the rotating box 057 according to the invention, in which the insulation stripping knives are in the zero position (closed). In contrast, FIGS. 30 and 31 shows the diagram with opened, i.e. retracted, wedges 016. Further descriptive information appears in the list of reference symbols.

In the present application, reference is made in particular to clamping, centering and knife jaws. However, attachments which do not relate exclusively to jaws but, for example, also include centering or insulation stripping means other than jaw-like ones are also within the scope of the invention. For example, funnel-like means could also be used for centering, and laser knives, disk-like knives rotating about their own axis or the like could also be used for cutting. The components described or shown in connection with FIG. 22, such as drives, guides, etc., can also be used in the subjects of FIGS. 23-27, in a manner comprehensible to a person skilled in the art.

Although not stated in more detail, it is however clear to a person skilled in the art with regard to the various automatic insulation stripping machines launched on the market by Schleuniger AG since 1985 that preferably a control apparatus (27) with a data memory and a data input apparatus is provided, which control apparatus program-controls the relative length position of the cutting apparatus (030) with respect to the cable (107) and/or the multistage cutting depth of the knife. This also applies to the complete computer control of the drives of the other embodiments.

The invention claimed is:

1. A continuous cable processing apparatus, comprising:
    a pair of tool supports (1,2) for holding at least one pair of two tools (3), and
    a tool support feed (5) for positioning of at least one of said at least one pair of two tools (3a, b, c, d) in a direction perpendicular to the working direction of said at least one of said two tools, across a first transport path (100), along which a cable (107) whose insulation is to be stripped can be inserted in its feed direction, wherein
    an encoder (41) is arranged on an adjuster (18) for tool setting and monitors movement of said adjuster 18 in an operating state in order to perform at least one of the following:
    to detect completed closure of said at least one of said at least one pair of two tools (3), or
    to stop drive movement of said at least one pair of two tools,
    wherein said adjuster comprises an adjusting spindle.

2. The apparatus as claimed in claim 1,
    wherein the tool support feed (5) laterally, relative to the first transport path, positions at least one of said at least two tools (3a, b, c, d) above the first transport path (100) along which the cable (107) whose insulation is to be stripped can be inserted and transported in its feed direction, whereas the axis of said cable is parallel to said first transport path, wherein
    said tool support feed (5) is formed for a controlled lateral drive for controlled sideward movement of at least one of said pair of tool supports (1,2) to any desired position within a working range laterally with respect to said first transport path (100).

3. A cable processing apparatus according to claim 1, wherein connection between a drive (23;16), for opening and closing said at least one pair of two tools, and said spindle 18 is elastic.

4. Apparatus according to claim 3, wherein said connection comprises a coupling via a toothed belt (24).

5. The cable processing apparatus according to claim 1, wherein said adjuster adjusts as a function of drive movement of a drive (23; 16) by comparison with a comparable encoder value of said drive (23; 16) on said encoder.

* * * * *

UNITED STATES PATENT AND TRADEMARK OFFICE
CERTIFICATE OF CORRECTION

PATENT NO.       : 7,257,878 B2
APPLICATION NO.  : 10/972634
DATED            : August 21, 2007
INVENTOR(S)      : Beat Locher and Jiri Stepan It is certified that error appears in the above-identified patent and that said Letters Patent is hereby corrected as shown below:

In the front page of the patent, the name of the second-listed inventor "Jiri Stephan" should read:  -- Jiri Stepan --

Signed and Sealed this
Fifth Day of April, 2011

David J. Kappos
*Director of the United States Patent and Trademark Office*